United States Patent
Lee et al.

(10) Patent No.: US 12,412,278 B2
(45) Date of Patent: Sep. 9, 2025

(54) OBJECT DETECTION USING SKEWED POLYGONS SUITABLE FOR PARKING SPACE DETECTION

(71) Applicant: NVIDIA Corporation, Santa Clara, CA (US)

(72) Inventors: Dongwoo Lee, Seoul (KR); Junghyun Kwon, San Jose, CA (US); Sangmin Oh, San Jose, CA (US); Wenchao Zheng, San Jose, CA (US); Hae-Jong Seo, San Jose, CA (US); David Nister, Bellevue, WA (US); Berta Rodriguez Hervas, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/424,219

(22) Filed: Jan. 26, 2024

(65) Prior Publication Data

US 2024/0169549 A1    May 23, 2024

Related U.S. Application Data

(63) Continuation of application No. 17/457,825, filed on Dec. 6, 2021, now Pat. No. 11,941,819, which is a
(Continued)

(51) Int. Cl.
*G06T 7/13* (2017.01)
*G06T 7/40* (2017.01)
(Continued)

(52) U.S. Cl.
CPC ............... *G06T 7/13* (2017.01); *G06T 7/40* (2013.01); *G06T 17/30* (2013.01); *G06V 10/454* (2022.01);
(Continued)

(58) Field of Classification Search
None
See application file for complete search history.

(56) References Cited

U.S. PATENT DOCUMENTS 10,106,153 B1    10/2018   Xiao et al.
10,885,698 B2    1/2021    Muthler et al.
(Continued)

FOREIGN PATENT DOCUMENTS

CN    106384532 A    2/2017
CN    108875577 A    11/2018
(Continued)

OTHER PUBLICATIONS

Lee, Dongwoo; First Office Action for Chinese Patent Application No. 202080021666.9, filed Sep. 15, 2021, mailed Jun. 20, 2024, 8 pgs. English Abstract Included.
(Continued)

*Primary Examiner* — Talha M Nawaz
(74) *Attorney, Agent, or Firm* — Taylor Duma L.L.P.

(57) ABSTRACT

A neural network may be used to determine corner points of a skewed polygon (e.g., as displacement values to anchor box corner points) that accurately delineate a region in an image that defines a parking space. Further, the neural network may output confidence values predicting likelihoods that corner points of an anchor box correspond to an entrance to the parking spot. The confidence values may be used to select a subset of the corner points of the anchor box and/or skewed polygon in order to define the entrance to the parking spot. A minimum aggregate distance between corner points of a skewed polygon predicted using the CNN(s) and ground truth corner points of a parking spot may be used simplify a determination as to whether an anchor box should be used as a positive sample for training.

20 Claims, 15 Drawing Sheets

Related U.S. Application Data continuation of application No. 16/820,164, filed on Mar. 16, 2020, now Pat. No. 11,195,331.

(60) Provisional application No. 62/819,544, filed on Mar. 16, 2019.

(51) Int. Cl.
    *G06T 17/30*     (2006.01)
    *G06V 10/44*     (2022.01)
    *G06V 10/75*     (2022.01)
    *G06V 10/772*    (2022.01)
    *G06V 10/82*     (2022.01)
    *G06V 20/58*     (2022.01)

(52) U.S. Cl.
    CPC .......... *G06V 10/751* (2022.01); *G06V 10/772* (2022.01); *G06V 10/82* (2022.01); *G06V 20/586* (2022.01); *G06T 2207/10021* (2013.01); *G06T 2207/20084* (2013.01); *G06T 2207/30264* (2013.01)

(56) References Cited

U.S. PATENT DOCUMENTS

| | | | |
|---|---|---|---|
| 11,941,819 B2 | 3/2024 | Lee et al. | |
| 2010/0026718 A1 | 2/2010 | Jetha et al. | |
| 2010/0211267 A1* | 8/2010 | Shimazaki | G08G 1/168 340/932.2 |
| 2016/0093214 A1 | 3/2016 | Wu et al. | |
| 2017/0206431 A1 | 7/2017 | Sun et al. | |
| 2017/0253236 A1* | 9/2017 | Hayakawa | G08G 1/143 |
| 2017/0294121 A1 | 10/2017 | Jain et al. | |
| 2018/0025640 A1* | 1/2018 | Micks | G06N 3/08 340/932.2 |
| 2018/0128638 A1* | 5/2018 | Lei | G08G 1/143 |
| 2018/0239968 A1 | 8/2018 | Gupta et al. | |
| 2018/0253645 A1 | 9/2018 | Burr | |
| 2019/0101924 A1 | 4/2019 | Styler et al. | |
| 2019/0291720 A1 | 9/2019 | Xiao et al. | |
| 2020/0139959 A1 | 5/2020 | Akella et al. | |
| 2020/0142417 A1 | 5/2020 | Hudecek | |
| 2020/0279483 A1 | 9/2020 | Eather et al. | |
| 2020/0398833 A1 | 12/2020 | Hudecek et al. | |
| 2020/0398894 A1 | 12/2020 | Hudecek et al. | |
| 2021/0096565 A1 | 4/2021 | Xie et al. | |
| 2021/0118299 A1* | 4/2021 | Yata | B62D 6/00 |

FOREIGN PATENT DOCUMENTS

| | | |
|---|---|---|
| CN | 109086708 A | 12/2018 |
| CN | 109063559 A | 5/2021 |
| EP | 3349201 A1 | 7/2018 |
| KR | 20100096757 A | 9/2010 |

OTHER PUBLICATIONS

Lee, Dongwoo; Non-Final Office Action received for U.S. Appl. No. 17/457,825, filed Dec. 6, 2021, mailed Dec. 8, 2022, 13 pgs.

"Taxonomy and Definitions for Terms Related to Driving Automation Systems for On-Road Motor Vehicles", Society of Automotive Engineers (SAE), Standard No. J3016-201609, p. 30 (Sep. 30, 2016).

"Taxonomy and Definitions for Terms Related to Driving Automation Systems for On-Road Motor Vehicles", Society of Automotive Engineers (SAE), Standard No. J3016-201806, pp. 35 (Jun. 15, 2018).

Lee, et al.; Final Office Action for U.S. Appl. No. 17/457,825, filed Dec. 6, 2021, mailed Jun. 29, 2023, 10 pgs.

Lee, Dongwoo; Notice of Allowance for U.S. Appl. No. 17/457,825, filed Dec. 6, 2021, mailed Nov. 1, 2023, 10 pgs.

Lee, Dongwoo; International Search Report and Written Opinion for PCT Application No. PCT/US2020/022997, filed Mar. 16, 2020, mailed Sep. 1, 2020, 15 pgs.

Jiang, et al; "R2CNN: Rotational Region CNN for Orientation Robust Scene Text Detection," arXiv: 1706.09579v2, Jun. 20, 2017, 8 pgs.

* cited by examiner

OBJECT DETECTION USING SKEWED POLYGONS SUITABLE FOR PARKING SPACE DETECTION

CROSS-REFERENCE TO RELATED APPLICATIONS

This application is a continuation of U.S. patent application Ser. No. 17/457,825, filed Dec. 6, 2021, which is a continuation of U.S. patent application Ser. No. 16/820,164, filed Mar. 16, 2020, which claims the benefit of U.S. Provisional Application No. 62/819,544, filed on Mar. 16, 2019. Each of these applications is incorporated herein by reference in its entirety.

BACKGROUND

Accurate and efficient image processing (e.g., for recognition and classification) by a machine (e.g., a computer programmed with a trained neural network) is important in various contexts. For example, autonomous vehicles (e.g., vehicles equipped with advanced driver assistance systems (ADAS)) or drones may analyze image data in real time (e.g., representing images of a roadway and/or a parking lot captured by a camera) to formulate driving operations (e.g., turn steering device left, activate brake system, etc.). In one such instance, a vehicle may analyze image data when performing a parking operation in order to detect parking spaces, and to identify properties of the parking spaces, such as location, size, and orientation. To facilitate this process the vehicle may include an object detector that is implemented using a convolutional neural network (CNN) to detect the existence of parking spaces in images.

A conventional CNN used to detect parking spaces may use axis-aligned rectangular anchor boxes (all four angles are right angles) as a form of detection output. However, parking spaces present in sensor data are often not rectangular or axis-aligned due to the perspective projection of the sensor. As such, additional processing is necessary to accurately identify the bounds of each of the parking spaces among the sensor data once they are detected. For example, a camera on a vehicle may capture an image of a parking space, and based on the perspective of the camera's field of view, the parking space may not be depicted in the image as an axis-aligned rectangle. A conventional CNN may provide an axis-aligned rectangular anchor box as a form of detection output, in which case additional processing is necessary to accurately delineate the parking space in the image. When training the conventional CNN, positive samples may be identified using an Intersection of Union (IoU) between an anchor box output from the CNN and a ground truth output. The IoU calculation may be straightforward as the anchor box outputs and ground truth are both axis-aligned rectangles.

SUMMARY

The present disclosure relates to object detection using skewed polygons (e.g., quadrilaterals) suitable for parking space detection. For example, in some instances at least one Convolutional Neural Network (CNN) may be used to detect and/or delineate one or more parking spaces represented in image data. The CNN(s) output may be post-processed and provided to a downstream system (e.g., vehicle control module) to inform subsequent operations.

Aspects of the disclosure may use a CNN(s) to determine corner points of a skewed polygon (e.g., as displacement or offset values to anchor shape corner points) that accurately delineate a region in an image that defines a parking space. Furthermore, the disclosure provides for a CNN(s) that outputs confidence values predicting likelihoods that corner points of an anchor shape define or otherwise correspond to an entrance to a parking spot. The confidence values may be used to select a subset of the corner points of the anchor shape and/or skewed polygon in order to define the entrance to the parking spot. In accordance with embodiments of the disclosure, the CNN(s) may be used to both predict likelihoods particular corner points of an anchor shape correspond to an entrance to a parking space along with predicting the displacement values to the corner points that delineate the bounds of the parking space.

The disclosure further provides for computing a distance (e.g., minimum aggregate distance) between corner points of a skewed polygon predicted using a CNN(s) and ground truth corner points of a parking spot to determine whether the anchor shape should be used as a positive sample for training. For example, a positive sample may be identified based at least in part on the distance being below a threshold value.

BRIEF DESCRIPTION OF THE DRAWINGS

The present systems and methods for object detection using skewed polygons suitable for parking space detection is described in detail below with reference to the attached drawing figures, which are incorporated herein by reference, wherein.

DETAILED DESCRIPTION

Figure 1:
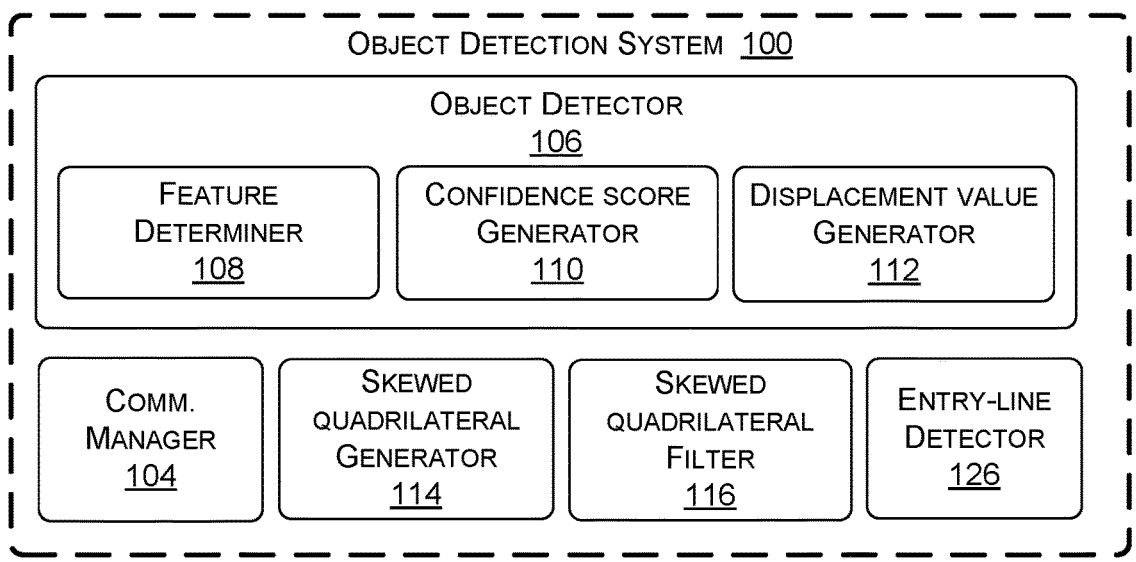
FIG. 1 is an illustration including an example object detection system, in accordance with some embodiments of the present disclosure.

The present disclosure relates to object detection using skewed polygons (e.g., quadrilaterals) suitable for parking space detection. Disclosed approaches may be suitable for driving operations (e.g., autonomous driving, advanced driver assistance systems (ADAS), etc.) in which a parking space is detected, as well as other applications (e.g., robotics, video analysis, weather forecasting, medical imaging, etc.) detecting objects (e.g., buildings, windows, doors, driveways, intersections, teeth, real-property tracts, areas or regions of surfaces, etc.) corresponding with skewed polygons in image and/or sensor data.

The present disclosure may be described with respect to an example autonomous vehicle 1100 (alternatively referred to herein as "vehicle 1100" or "autonomous vehicle 1100"), an example of which is described in more detail herein with respect to FIGS. 11A-11D. Although the present disclosure primarily provides examples using autonomous vehicles, other types of devices may be used to implement the various approaches described herein, such as robots, unmanned aerial vehicles, camera systems, weather forecasting devices, medical imaging devices, etc. In addition, these approaches may be used for controlling autonomous vehicles, or for other purposes, such as, without limitation, video surveillance, video or image editing, parking space occupancy monitoring, identification, and/or detection, video or image search or retrieval, object tracking, weather forecasting (e.g., using RADAR data), and/or medical imaging (e.g., using ultrasound or magnetic resonance imaging (MRI) data).

While parking spaces are primarily described as the objects being detected, disclosed approaches may generally apply to objects that may appear as skewed polygons (such as quadrilaterals or other shapes) in a field of view of a sensor and/or in image data (e.g., these objects may be rectangular in the real world but appear as skewed quadrilaterals due to perspective). While disclosed approaches are described using skewed quadrilaterals and four corner points, disclosed concepts may apply to any number of shapes and points (e.g., corner points) that define those shapes. Additionally, while an entrance is primarily defined herein as being defined by two of the points (e.g., corner points), in other examples an entrance may be defined using any number of points (e.g., corner points). Further, while the disclosure focuses on object detectors implemented using neural networks, in some embodiments other types of machine learning models may be employed.

In contrast to conventional approaches, which may use a CNN to predict an axis-aligned rectangular anchor box generally indicating the size and location of a parking space, aspects of the disclosure may use a CNN(s) to determine corner points of a skewed quadrilateral (e.g., as displacement or offset values to anchor box corner points) that accurately delineate a region in an image that defines a parking space. As such, in some embodiments, the skewed quadrilateral may be directly consumed by downstream systems without requiring additional or significant processing to identify the bounds of the parking space. By reducing subsequent processing, disclosed approaches may be more efficient and faster than conventional approaches.

Furthermore, in contrast to conventional approaches, the disclosure provides for a CNN(s) that outputs confidence values predicting likelihoods that corner points of an anchor box define or otherwise correspond to an entrance to a parking spot. The confidence values may be used to select a subset of the corner points of the anchor box and/or skewed quadrilateral in order to define the entrance to the parking spot. In accordance with embodiments of the disclosure, processing may further be reduced by using the CNN(s) to both predict likelihoods particular corner points of an anchor box correspond to an entrance to a parking space along with predicting the displacement values to the corner points that delineate the bounds of the parking space.

In another aspect, while a conventional CNN uses Intersection over Union (IoU) to determine whether an axis-aligned rectangular anchor box output is a positive sample, the disclosure provides for computing a minimum aggregate distance between corner points of a skewed quadrilateral predicted using a CNN(s) and ground truth corner points of a parking spot to determine whether the anchor box should be used as a positive sample for training. For example, a positive sample may be identified based at least in part on the minimum aggregate distance (e.g., after normalization) being below a threshold value. Computing the minimum aggregate distance may be more straightforward than computing an IoU for a skewed quadrilateral, resulting is reduced processing time.

Example Parking Space Detector

Now referring to FIG. 1, FIG. 1 shows an illustration including an example object detection system 100, in accordance with some embodiments of the present disclosure. It should be understood that this and other arrangements described herein are set forth only as examples. Other arrangements and elements (e.g., machines, interfaces, functions, orders, and groupings of functions, etc.) may be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

In one or more embodiments, the object detection system 100 includes, for example, a communications manager 104, an object detector 106, a feature determiner 108, a confidence score generator 110, a displacement value generator 112, a skewed quadrilateral generator 114, and an entrance determiner 126. Some examples described in this disclosure use quadrilaterals (e.g., regular, skewed, irregular, boxes, etc.), and the systems and methods described may similarly use other polygons.

The communications manager 104 may be configured to manage communications received by the object detection system 100 (e.g., comprising sensor data and/or image data) and/or provided by the object detection system 100 (e.g., comprising confidence scores, displacement scores, corner points of a skewed quadrilateral, and/or information derived therefrom). Additionally or alternatively, the communications manager 104 may manage communications within the object detection system 100, such as between any of the object detector 106, the Confidence score generator 110, the displacement value generator 112, the skewed quadrilateral generator 114, the entrance determiner 126, and/or other components that may be included in the object detection system 100 or may communicate with the object detection system 100, (e.g., downstream system components consuming output from the object detection system 100).

Figure 2:
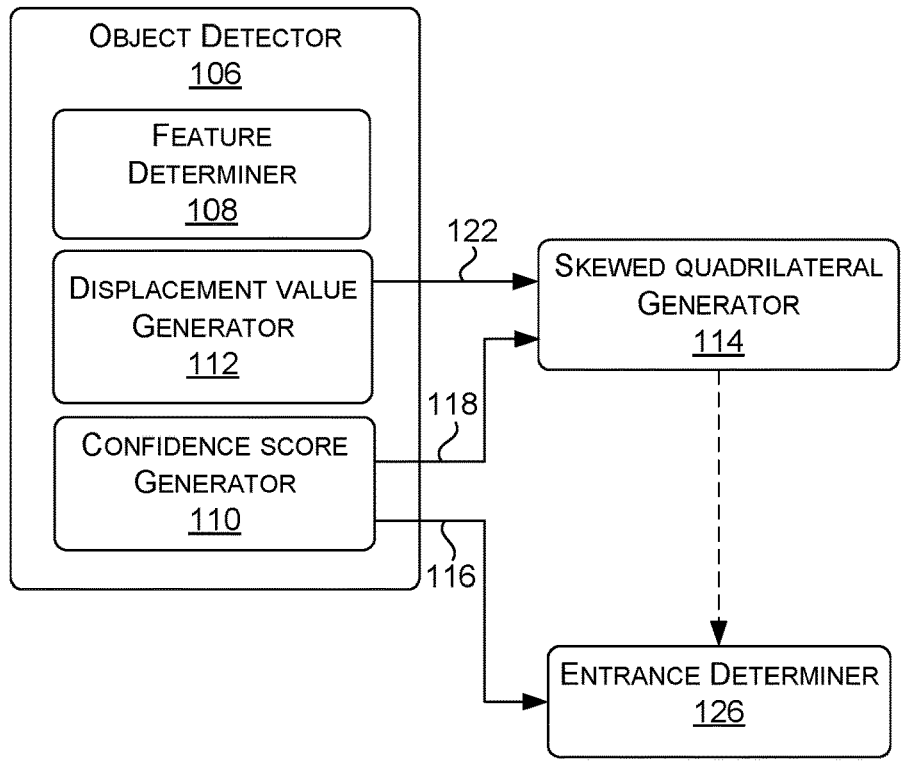
FIG. 2 is a flow diagram illustrating an example process for identifying one or more parking spaces, in accordance with some embodiments of the present disclosure.

With reference to FIG. 2, FIG. 2 is a flow diagram illustrating an example process 200 for identifying one or more parking spaces, in accordance with some embodiments of the present disclosure. The object detector 106 may be configured to analyze input data, such as sensor data and/or image data representative of any number of parking spaces (or no parking spaces), received from the communications manager 104 and generate object detection data that is representative of any number of detected objects captured in the input data. To do so, the object detector 106 may use the feature determiner 108, the displacement value generator 112, and the confidence score generator 110. The feature determiner 108 may be configured to generate or determine features of the input data as inputs to the confidence score generator 110 and the displacement value generator 112. The confidence score generator 110 may be configured to generate or determine a confidence score 118 of one or more anchor boxes based on data from the feature determiner 108. The confidence score 118 of each anchor box may predict a likelihood that the respective anchor box corresponds to a parking space detected in the input data.

The displacement value generator 112 may be configured to generate or determine displacement values 122 to corner points of each anchor box based on data from the feature determiner 108. The skewed quadrilateral generator 114 may receive as input, any of the various outputs from the object detector 106, such as the confidence value 118 and the displacement values 122 of each anchor box. The skewed quadrilateral generator 114 may generate and/or determine a skewed quadrilateral from the input using any suitable technique, such as Non-Maximum Suppression (NMS). This may include the skewed quadrilateral generator 144 determining, from any number of anchor boxes corner points of the skewed quadrilateral from the displacement values 122 (e.g., provided by the displacement value generator 112) and the corner points of the anchor box(s). As a non-limiting example, the skewed quadrilateral generator 114 may determine which anchor boxes have a confidence value 118 exceeding a threshold value (if any). From those anchor boxes, the skewed quadrilateral generator 114 may filter and/or cluster the candidate detections into one or more output object detections and determine corner points of skewed quadrilaterals that correspond to those output object detections (e.g., using corresponding displacement values 122).

In addition to or instead of the confidence score generator 110 generating or determining a confidence score 118 predicting a likelihood that a respective anchor box corresponds to a parking space detected in the input data, the confidence score generator 110 may generate or determine a confidence score 116 predicting a likelihood that a detected entrance to a parking space represented in the input data. The entrance determiner 126 may use at least the confidence scores 116 to determine one or more entrances to one or more parking spaces. As a non-limiting example, the entrance determiner 126 may define an entrance for each object detection output by the skewed quadrilateral generator 114 by selecting a set of corner points of each skewed quadrilateral (e.g., two corner points) that have the highest confidence values 116 (e.g., optionally requiring those confidence values 116 to exceed a threshold value). The selected corner points may then be used to define an entrance to the corresponding parking space (e.g., an entry-line that connects the selected corner points). As indicated by a dashed line in FIG. 2, in other examples the skewed quadrilateral generator 114 may not be implemented in an object detection system 100 with the entrance determiner 126 and/or used by the entrance determiner 126 in order to identify and/or define entrances to parking spaces or other detected object regions.

Figure 10:
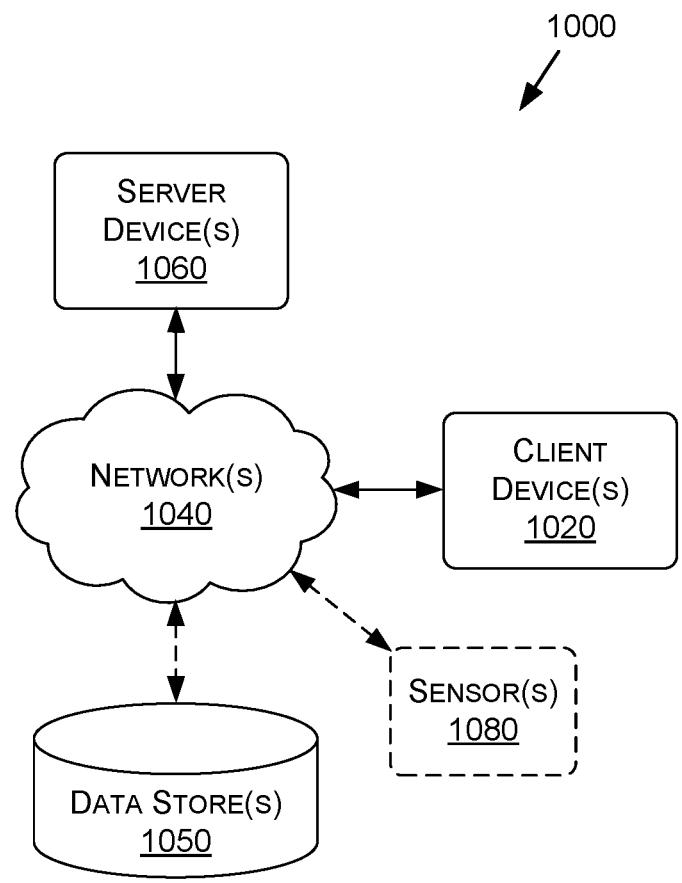
FIG. 10 is an illustration of an example operating environment suitable for use in implementing some embodiments of the present disclosure.

The object detection system 100 may be implemented in an example operating environment 1000 of FIG. 10, in accordance with some embodiments of the present disclosure. For example, the components of FIG. 1 may generally be implemented using any combination of a client device(s) 1020, a server device(s) 1060, or a data store(s) 1050. Thus, the object detection system 100 may be provided via multiple devices arranged in a distributed environment that collectively provide the functionality described herein, or may be embodied on a single device (e.g., the vehicle 1100). Thus, while some examples used to describe the object detection system 100 may refer to particular devices and/or configurations, it is contemplated that those examples may be more generally applicable to any of the potential combinations of devices and configurations described herein. For example, in some embodiments, at least some of the sensors 1080 used to generate one or more portions of sensor data input to the object detector 106 may be distributed amongst multiple vehicles and/or objects in the environment and/or at least one of the sensors 1080 may be included in the vehicle 1100.

Figure 11A:
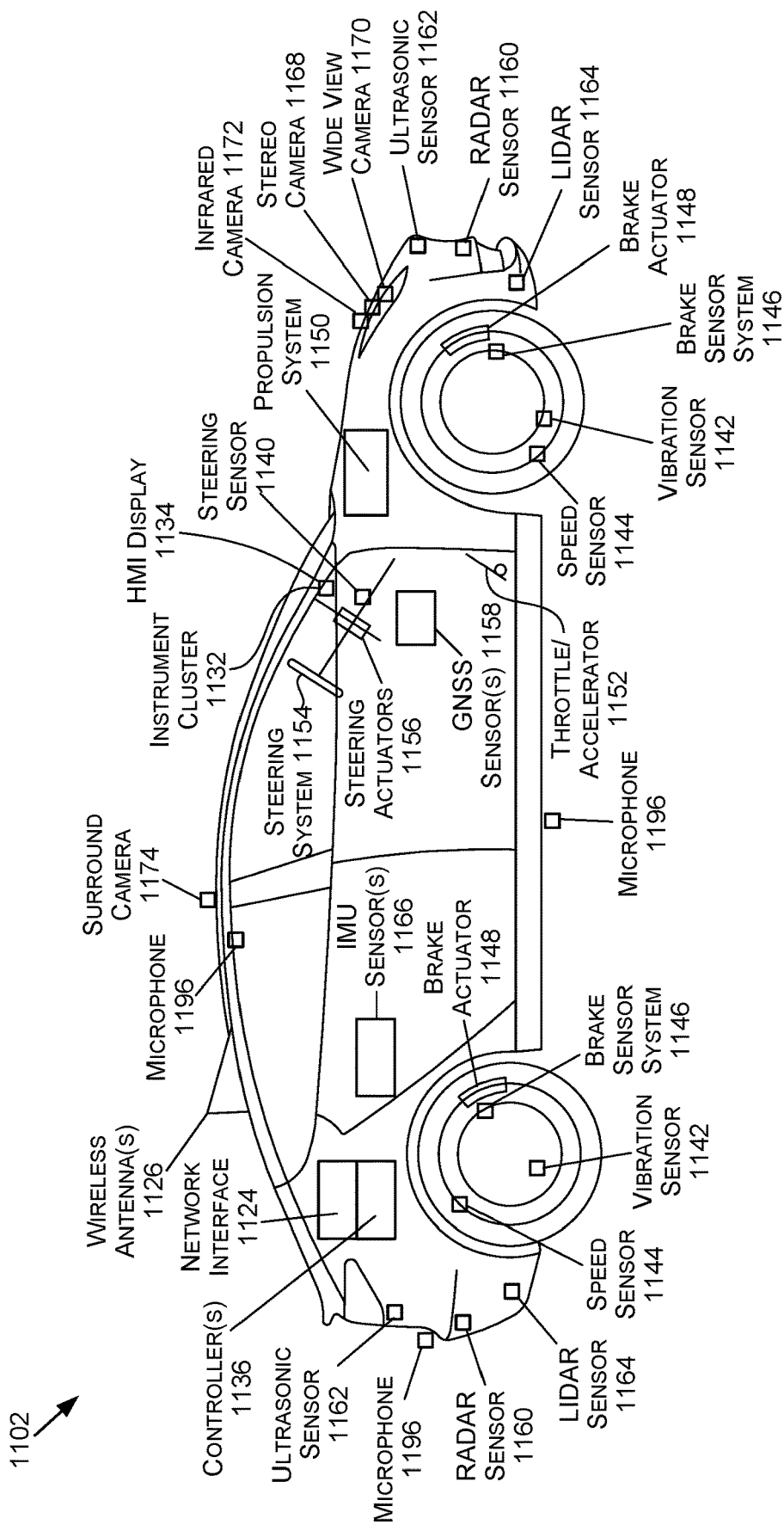
FIG. 11A is an illustration of an example autonomous vehicle, in accordance with some embodiments of the present disclosure.

As mentioned herein, the communications manager 104 may be configured to manage communications received by the object detection system 100 (e.g., comprising sensor data and/or image data) and/or provided by the object detection system 100 (e.g., comprising the confidence scores or values, displacement values, corner points to skewed quadrilaterals, and/or information derived therefrom). Additionally or alternatively, the communications manager 104 may manage communications within the object detection system 100.

Where a communication is received and/or provided as a network communication, the communications manager 104 may comprise a network interface which may use one or more wireless antenna(s) (wireless antenna(s) 1126 of FIG. 11A) and/or modem(s) to communicate over one or more networks. For example, the network interface may be capable of communication over Long-Term Evolution (LTE), Wideband Code-Division Multiple Access (WCDMA), Universal Mobile Telecommunications Service (UMTS), Global System for Mobile communications (GSM), CDMA2000, etc. The network interface may also enable communication between objects in the environment (e.g., vehicles, mobile devices, etc.), using local area network(s), such as Bluetooth, Bluetooth Low Energy (LE), Z-Wave, ZigBee, etc., and/or Low Power Wide-Area Network(s) (LPWANs), such as Long Range Wide-Area Network (LoRaWAN), SigFox, etc. However, the communications manager 104 need not include a network interface, such as where the object detection system 100 implemented completely on an autonomous vehicle (e.g., the vehicle 1100). In some examples, one or more of the communications described herein may be between components of a computing device 1200 over a bus 1202 of FIG. 12.

Sensor data received by the communications manager 104 may be generated using any combination of the sensors 1080 of FIG. 10. For example, the sensor data may include image data representing an image(s), image data representing a video (e.g., snapshots of video), and/or sensor data representing fields of view of sensors (e.g., LIDAR data from LIDAR sensor(s) 1164, RADAR data from RADAR sensor(s) 1160, image data from a camera(s) of FIG. 11B, etc.).

The sensor data and/or image data that the communications manager 104 provides to the object detector 106 may be generated in a physical or virtual environment and may include image data representative of a field(s) of view of a camera(s). For example, in aspects of the present disclosure, the communications manager 104 provides to the object detector 106 image data generated by a camera of the vehicle 1100 in a physical environment.

While some examples of a machine learning model(s) that may be used for the object detector 106 and/or other components described herein may refer to specific types of machine learning models (e.g., neural networks), it is contemplated that examples of the machine learning models described herein may, for example and without limitation, include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 3:
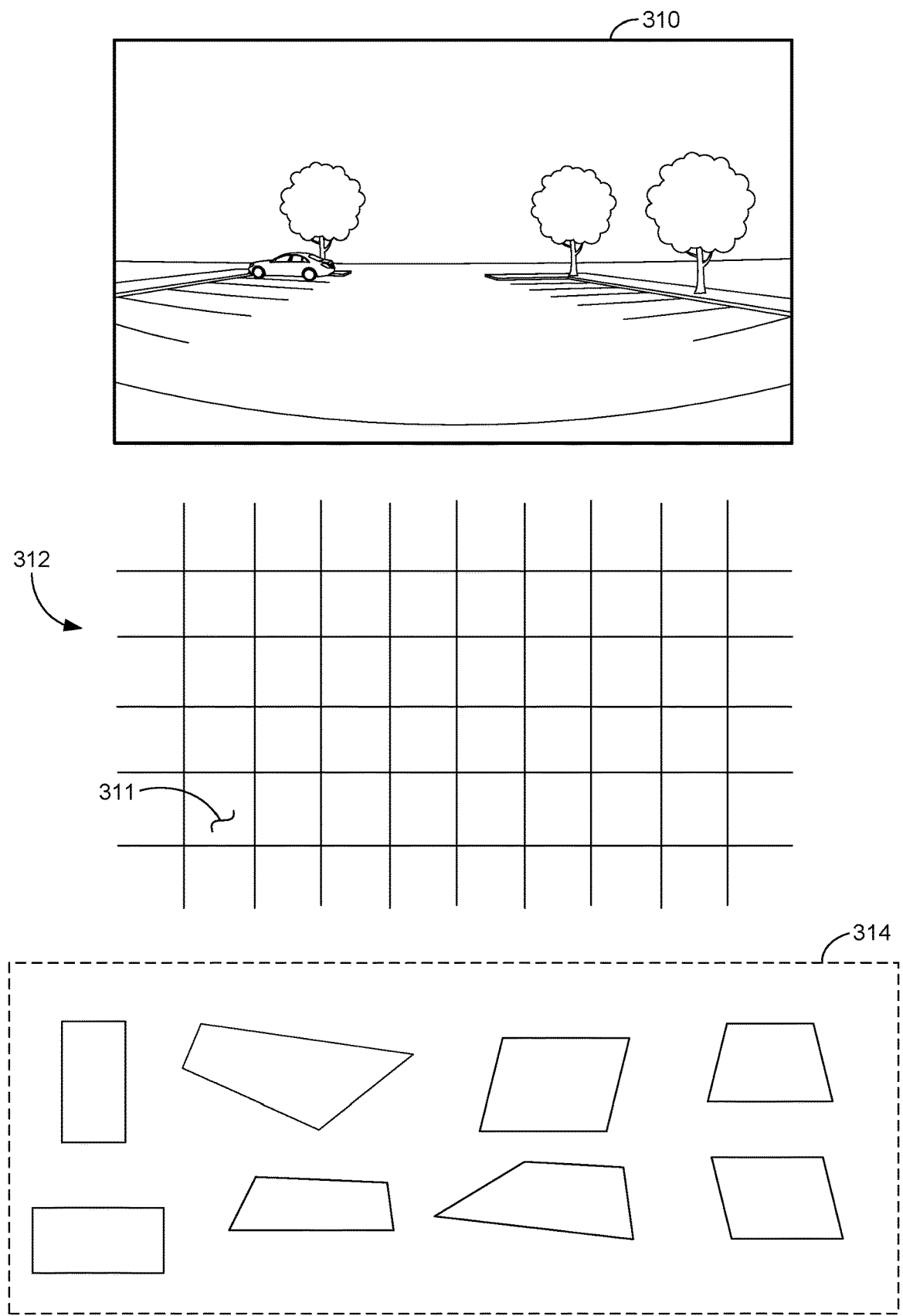
FIG. 3 is an illustration of an image that may be represented by image data processed by an object detector, a grid of spatial elements of the object detector, and a set of anchor shapes that may be associated with one or more of the spatial elements, in accordance with some embodiments of the present disclosure.

Referring to FIG. 3, FIG. 3 is an illustration of an image that may be represented by image data processed by an object detector, a grid of spatial elements of the object detector, and a set of anchor boxes that may be associated with one or more of the spatial elements, in accordance with some embodiments of the present disclosure. For example, FIG. 3 includes a depiction of an image 310 that may be generated by a camera of the vehicle 1100 in the physical environment and provided to the object detector 106, which may analyze the image data to generate object detection data. The object detection data may be representative of detections, by the object detector 106, of objects in the image 310 (which may also be referred to as detected objects). The detected objects may or may not correspond to actual objects depicted in the image 310. For example, some of the detected objects may correspond to false detections made by the object detector 106. Further, some of the detected objects may correspond to the same object depicted in the image 310.

The object detector 106 may comprise one or more machine learning models trained to generate the object detection data from features extracted from the sensor data (e.g., the image data). In some examples, the object detector 106 is configured to determine a set of object detection data (e.g., representing a confidence value and displacement values to corner points) for each spatial element and/or one or more corresponding anchor boxes thereof for a field of view and/or image. In various examples, a spatial element may also refer to a grid cell, an output cell, a super-pixel, and/or an output pixel of the object detector 106.

In various examples, the spatial elements may form a grid of spatial element regions. For example, FIG. 3 visually indicates a grid 312 of spatial elements of the object detector 106 that may be logically applied to sensor data (e.g., representing the image 310). In FIG. 3, the grid 312 is depicted separately from the image 310 so as not to obscure the image 310, and an overlaid depiction 402 is provided in FIG. 4. The spatial elements, such as a grid cell 311, may be defined by a location in the grid. For example, each grid-cell may contain a spatial element region of a spatial element. In other examples, grid-based spatial elements may not be used. Further, the spatial elements may not necessarily define contiguous spatial element regions, may not necessarily define rectangular-shaped spatial element regions, and/or may not cover all regions of a field of view and/or image.

In some examples, for a single image or frame (e.g., the image 310), or a set of images or frames, each spatial element of the object detector 106 may provide the object detection data for one or more corresponding anchor boxes. In other examples, one or more spatial elements may not provide object detection data. The object detection data may be representative of, for example, the confidence value 118, the displacement values 122, and/or the confidence values 116 of each anchor box of the spatial element, which may or may not correspond to a parking space in the field of view and/or the image 310.

FIG. 3 illustrates a set of anchor boxes 314 where each spatial element applied to the image 310 may be associated with a corresponding set of the anchor boxes 314. Illustrated are eight anchor boxes, but any number of anchor boxes may be used for a spatial element and anchor boxes for different spatial elements may be different from one another in shape, size, number, etc. The anchor boxes may be various sizes and shapes, such as regular rectangles (e.g., equiangular rectangles); and in contrast to some conventional systems, the anchor boxes may also include one or more skewed quadrilaterals, such as irregular rectangles (e.g., no congruent angles); rhombus; kite; trapezoid; parallelogram; isosceles trapezoid; skewed quadrilateral; or any combination thereof. In FIG. 3, the anchor boxes 314 are depicted separate from the image 310 so as not to obscure the image 310, and an overlaid depiction 402 is provided in FIG. 4.

Figure 4:
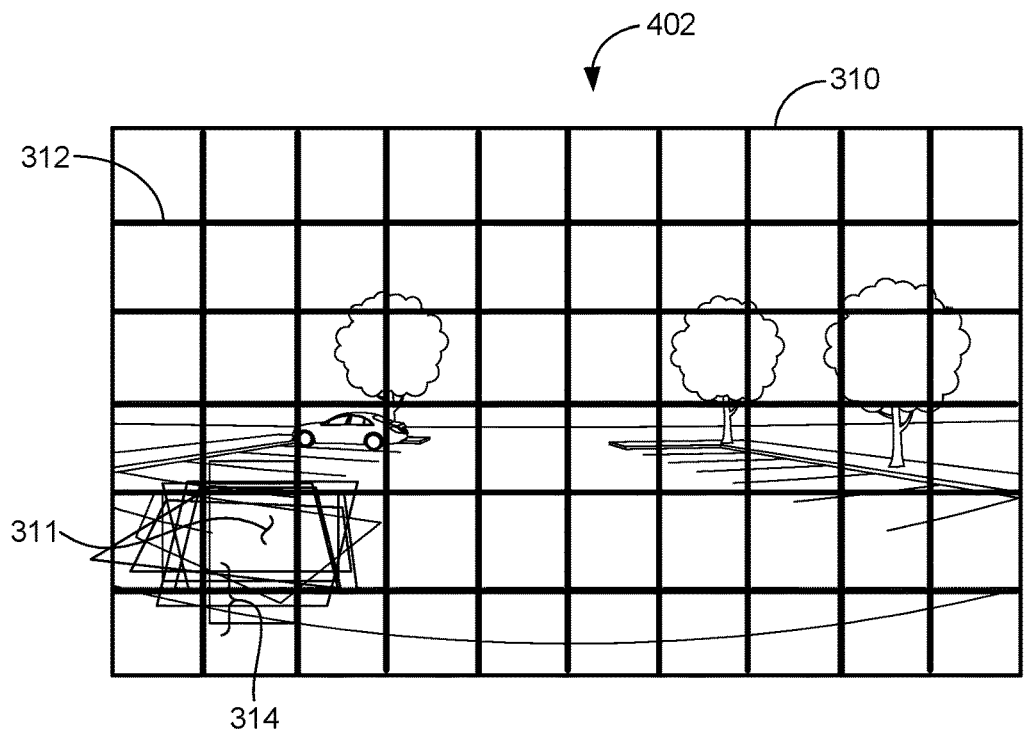
FIG. 4 is an illustration of images overlaid with visual elements for different spatial element resolutions, in accordance with some embodiments of the present disclosure.
Figure 4:
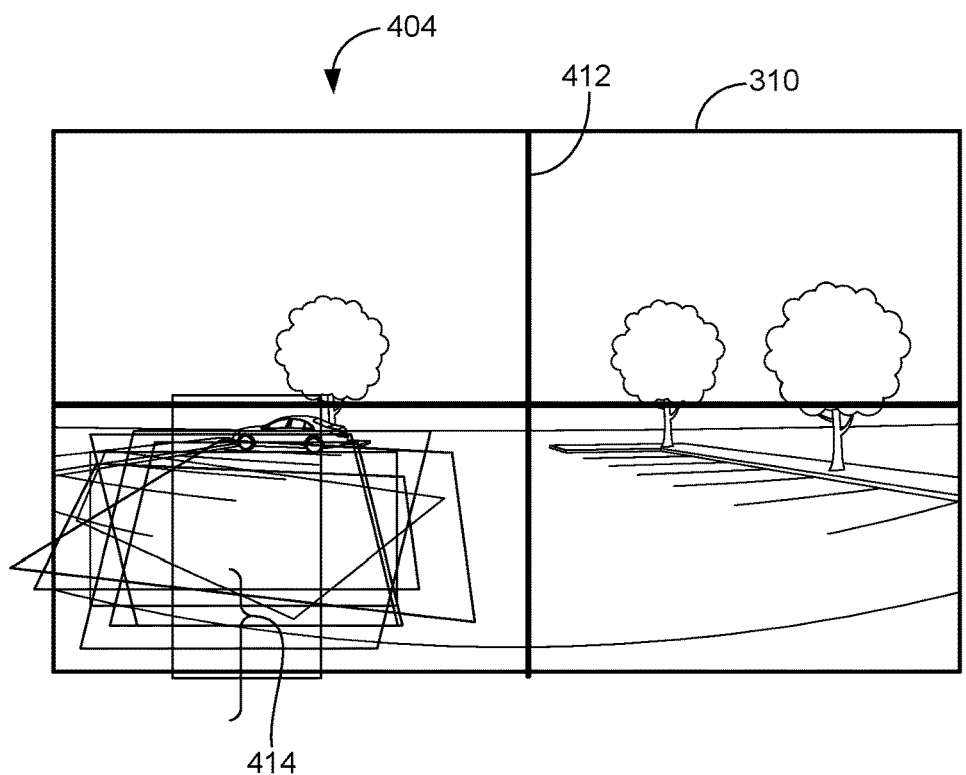

As described herein, FIG. 4 provides the overlaid depiction 402 in which the image 310 is overlaid with the grid 312, and the anchor boxes 314 for a single spatial element are positioned at the grid cell 311 it indicate corresponding locations with respect to the image 310. As described herein, a confidence score(s) and displacement values may be generated for each anchor box of each grid cell and/or spatial element. For example purposes, the anchor boxes 314 are depicted for only one grid cell 311, and in other aspects the anchor boxes 314 (or a variation thereof) may be used for multiple grid cells of the grid 312, or each grid cell of the grid 312. The anchor boxes 314 for a different grid cell 311 may be at locations corresponding to that grid cell 311 (or more generally spatial element). The grid 312 is an example of one size or resolution of spatial element. As a non-limiting example, the grid 312 is 10×6 with 60 grid cells, and as such, if each grid cell is associated with eight anchor boxes, a confidence score(s) and displacement values may be generated for 480 different anchor boxes.

In other aspects, a grid or other arrangement of spatial element regions may have a different size or resolution with more spatial regions or fewer spatial regions, in which case the scale of the anchor boxes may be increased (e.g., with a courser grid with fewer, larger spatial regions) or decreased (e.g., with a finer grid with more, smaller spatial regions). For example, the overlaid depiction 404 includes the image 310 overlaid with a courser resolution grid 412 (e.g., 2×2) and with a different set of anchor boxes 414, which may be congruent to anchor boxes 314 (e.g., same shape and size), similar to anchor boxes 314 (e.g., same shape and/or different size), or dissimilar to anchor boxes 314 (e.g., different shape and/or different size). In some aspects of the present disclosure, the object detector may apply multiple resolutions of spatial element regions (e.g., grids) to the same input data, each spatial element region corresponding to a respective set of anchor boxes. Among other potential advantages, using multiple resolutions may improve the likelihood that the object detector 106 is accurate for both larger parking spaces and smaller parking spaces, whether in the same image (e.g., parking spaces closer to the camera may appear larger based on the perspective, and parking spaces farther from the camera may appear smaller) or different images. In some instances, the actual sets of spatial element regions (e.g., grids) used to analyze input data may be significantly finer in resolution than the grids 312 and 412. Further, any number of sets of spatial element regions may be employed.

As described herein, based on the object detection data provided by the object detector 106 the skewed quadrilateral generator 114 may generate and/or identify one or more skewed quadrilaterals corresponding to one or more parking spaces and the entrance determiner 126 may determine and/or identify one or more entrances to one or more parking spaces.

Figure 5A:
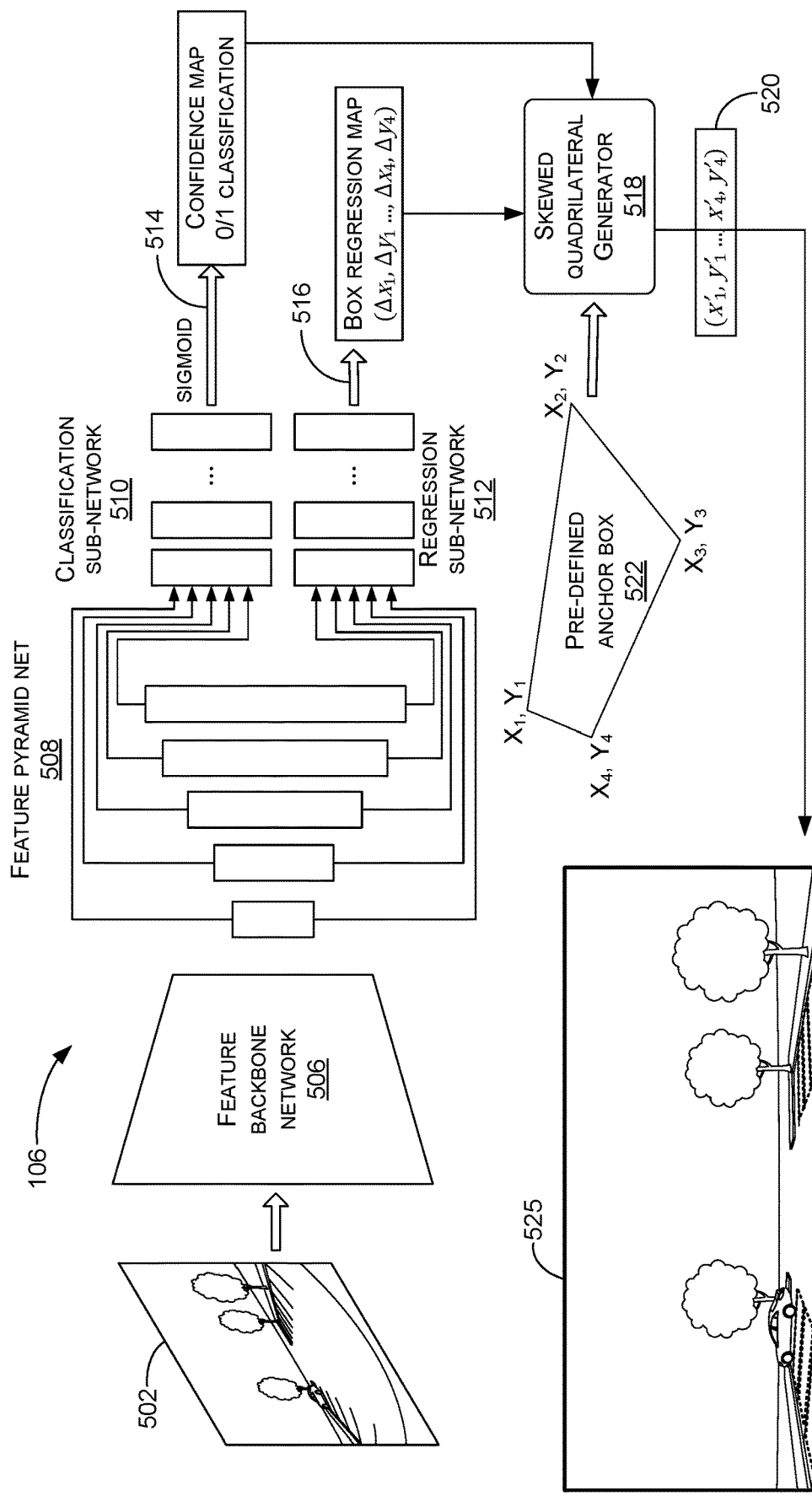
FIG. 5A is an illustration that includes a neural network for detecting parking spaces, in accordance with some embodiments of the present disclosure.

Referring to FIG. 5A, FIG. 5A depicts at least a portion of an example object detector 106 implemented using a neural network(s) (e.g., a CNN). For example, the object detector 106 includes a feature backbone network 506, such as ResNet 50 or another feature backbone network. In addition, the neural network includes a feature pyramid network 508. Furthermore, the neural network includes a classification sub-network 510.

In embodiments, the feature backbone network 506 and the feature pyramid network 508 may correspond to the feature determiner 108 of FIG. 1, the classification sub-network 510 may correspond to the confidence score generator 110 of FIG. 1, and the regression sub-network 512 may correspond to the displacement value generator 112 of FIG. 1. However, the depiction of the neural network in FIG. 5A is not intended to limit the object detector 106 to the neural network shown. Additionally, the classification sub-network 510 is shown as outputting data representative of a confidence score 514 (which may correspond to the confidence score 118 in FIG. 2). Although not shown for simplicity, in embodiments that detect entrances to parking spaces, the classification sub-network 510 may additionally or alternatively output data representative of the confidence scores 116 of FIG. 1 or another classification sub-network may be used. The regression sub-network 512 is shown as outputting data representative of displacement values 516 (which may correspond to the displacement values 122 in FIG. 2). The outputs described with respect to the object detector 106 in FIG. 5A may be provided for each predefined anchor box.

In a further aspect of the present disclosure, a skewed quadrilateral generator 518, which may correspond to the skewed quadrilateral generator 114 in FIG. 1, may generate and/or identify one or more skewed quadrilaterals based on the outputs from the object detector 106. For example, based on the displacement values 516 (e.g., $\Delta x_1, \Delta y_1 \ldots, \Delta x_4, \Delta y_4$) and the confidence value 514, the skewed quadrilateral generator 518 may select the anchor box and adjust the corner positions or points of the anchor box 522 (e.g., $x_1, y_1 \ldots, x_4, y_4$), to generate corner points (e.g., adjusted corner points 520 including $[x'_1, y'_1 \ldots, x'_4, y'_4]$) of a skewed quadrilateral. Data representative of the skewed quadrilateral (e.g., the adjusted corner points 520) may be provided to various downstream components or systems. As shown, in various embodiments, confidence map classification may be performed, such as to classify the anchor box as a positive or negative parking space detection (e.g., using a binary classification) and the skewed quadrilateral generator 518 may leverage this information. For example, the object detection system 100 may compare the confidence value 514 of each anchor box to a threshold value. A positive detection may result for an anchor box when the confidence value 514 is greater than the threshold value and a negative detection may result when the confidence value is less than the threshold value.

As non-limiting examples, the skewed quadrilateral generator 114 may generate and/or determine any number of skewed quadrilaterals by forming any number of clusters of detected objects by applying a clustering algorithm(s) to the outputs of the object detector 106 for the detected objects (e.g., after filtering out negative detections using the confidence values 514). To cluster detected objects, the skewed quadrilateral generator 114 may cluster the locations of the detected objects (e.g., candidate skewed quadrilaterals) together. This may be, for example, based at least in part on the confidence values 514 associated with the detected objects and/or other detected object data described herein. In some examples, the skewed quadrilateral generator 114 uses a Density-Based Spatial Clustering of Applications with Noise (DBSCAN) algorithm. Other examples include NMS or modified group Rectangles algorithms. A skewed quadrilateral may be selected, determined, and/or generated from each cluster as an output object detection (e.g., using one or more algorithms and/or neural networks).

Data representative of the adjusted corner points 520 and/or each skewed quadrilateral determined by the skewed quadrilateral generator 114, may be provided to various downstream components or systems. For example, in one instance, the corner points of skewed quadrilaterals may be provided to a vehicle control module, which may directly consume the corner points by converting the two-dimensional corner point coordinates to three-dimensional coordinates or otherwise processing that data, such as to coordinate parking operations of a vehicle. In another aspect, the corner points of a skewed quadrilateral(s) may be provided to an instrument cluster control module having a video or image monitor for displaying a representation of the one or more parking spaces. For example, the corner points may be used to annotate the image 502 and/or an image corresponding or the image 502 with the corner points delineated—e.g., annotated image 525 in FIG. 5A with the delineation (e.g., indicated by dotted lines) 526 of skewed quadrilaterals having adjusted corner points 520.

In a further aspect, the corner points of the skewed quadrilateral, the displacement values 122, and/or confidence values corresponding to the corner points of the anchor box (e.g., the confidence values 116) may be provided as input to the entrance determiner 126 to detect and/or define one or more entrances to one or more parking spaces (e.g., parking spaces identified by the skewed quadrilateral generator 114). For example, an entry line can be detected and/or defined by selecting the two corner points (e.g., of the four) with the highest confidence values amongst the confidence values 116 of an anchor box. In some examples, the selection may further be based on the confidence values being greater than a threshold value (e.g., indicating the corner points are each likely to correspond to an entrance). The entrance to a parking space may be defined as the entry line or otherwise determined and/or defined using the locations of the selected corner points.

Figure 5B:
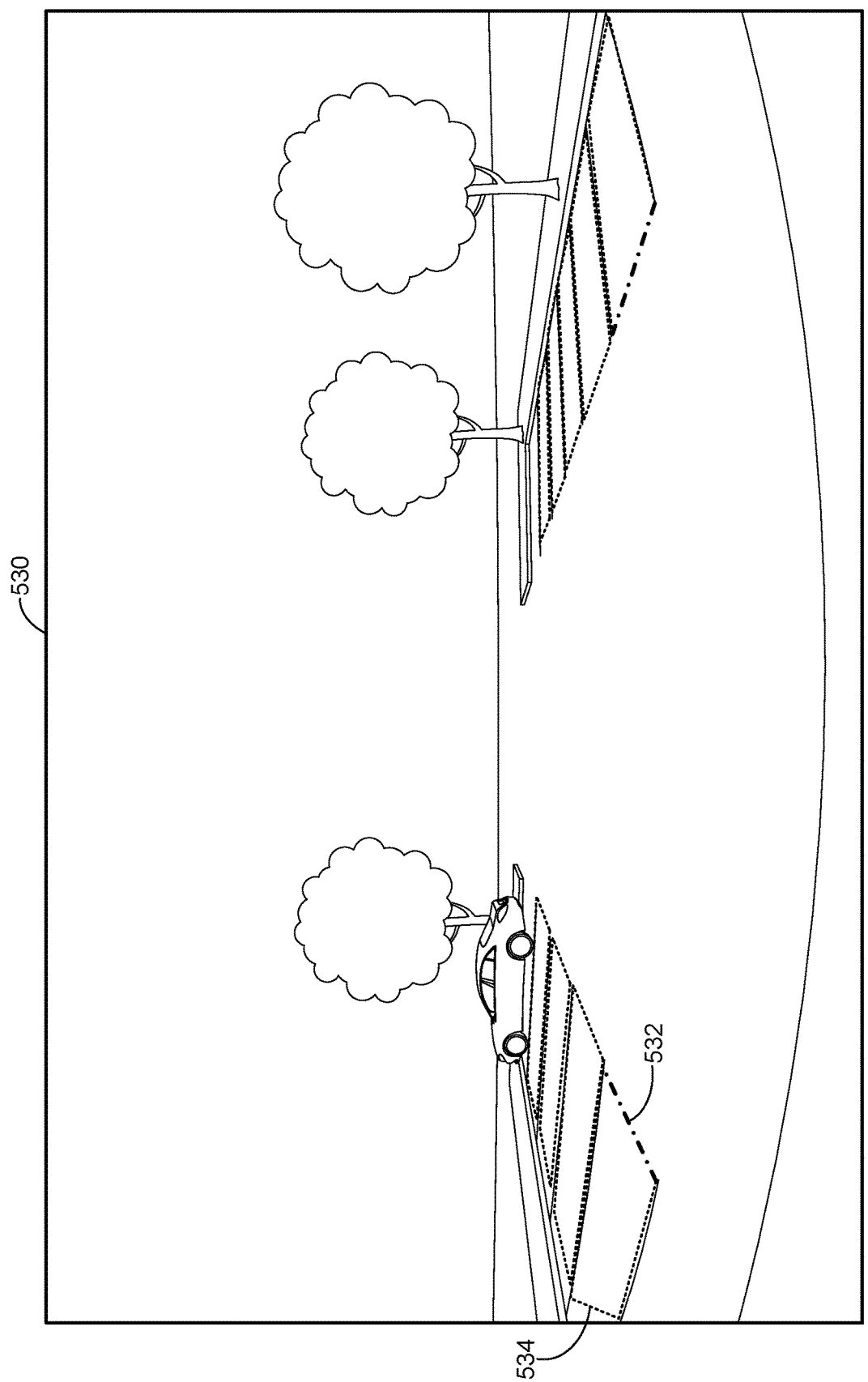
FIG. 5B is an illustration of an image with an entry-line delineation and a parking space delineation, in accordance with some embodiments of the present disclosure.

As such, the entrance information determined by the entrance determiner 126 may be provided to various downstream components or systems. For example, in some instances, the corner points identified as corresponding to an entrance may be provided to a vehicle control module, which may directly consume the corner points by converting the two-dimensional corner point coordinates to three-dimensional coordinates or otherwise processing the corner points. In another aspect, the corner points may be provided to an instrument cluster control module having a video or image monitor for displaying a representation of the one or more entrances to one or more parking spaces. For example, the corner points may be used to annotate the image 502 and/or an image corresponding or the image 502 with the corner points and/or entrance delineated—e.g., annotated image 530 in FIG. 5B may include the delineation (e.g., indicated by dashed lines) 532 of an entry line to a parking space. Optionally a parking space(s) delineation 534 (e.g., dotted line) may also be provided. In one example, a delineation of an entrance and/or a parking space may include a colored-line or other suitable annotation to an image.

Examples of Training a Machine Learning Model(s) for Object Detection

The object detector 106 may be trained using various possible approaches. In some examples, the object detector 106 may be trained in a fully supervised manner Training images together with their labels may be grouped in minibatches, where the size of the minibatches may be a tunable hyperparameter. Each minibatch may be passed to an online data augmentation layer which may apply transformations to images in that minibatch. The data augmentation may be used to alleviate possible overfitting of the object detector 106 to the training data. The data augmentation transformations may include (but are not limited to) spatial transformations such as left-right flipping, zooming-in/-out, random translations, etc., color transformations such as hue, saturation and contrast adjustment, or additive noise. Labels may be transformed to reflect corresponding transformations made to training images.

Augmented images may be passed to the object detector 106 to perform forward pass computations. The object detector 106 may perform feature extraction and prediction on a per spatial element basis (e.g., predictions related to anchor boxes). Loss functions may simultaneously measure the error in the tasks of predicting the various outputs (e.g., the confidence values and the displacement values for each anchor box).

The component losses for the various outputs may be combined together in a single loss function that applies to the whole minibatch. Then, backward pass computations may take place to recursively compute gradients of the cost function with respect to trainable parameters (typically at least the weights and biases of the object detector 106, but not limited to this as there may be other trainable parameters, e.g. when batch normalization is used). Forward and backward pass computations may typically be handled by a deep learning framework and software stack underneath.

A parameter update for the object detector 106 may then take place. An optimizer may be used to make an adjustment to trainable parameters. Examples include stochastic gradient descent, or stochastic gradient descent with a momentum term. The main hyperparameter connected to the optimizer may be the learning rate. There may also be other hyperparameters depending on the optimizer.

Images in the dataset may be presented in a random order for each epoch during training, which may lead to faster convergence. An epoch may refer to the number of forward/backward pass iterations used to show each image of the dataset once to the object detector 106 under training. The whole process 'forward-pass-backward-pass-parameter update' may be iterated until convergence of the trained parameters. Convergence may be assessed by observing the value of the loss function decrease to a sufficiently low value on both the training and validation sets, and determining that iterating further would not decrease the loss any further. Other metrics could be used to assess convergence, such as average precision computed over a validation set.

During training, validation may be performed periodically, and this may involve checking the average values of the loss function over images in a validation set (separate from the training set). As mentioned herein, each of the outputs of the object detector 106 (e.g., confidence score(s) of each anchor box, displacement values of each anchor box, etc.) may be associated with a separate loss function used for training. Any suitable loss function(s) may be used.

In accordance with an aspect of the present disclosure, ground-truth data for a parking space may include corner locations of the parking space, and the corner locations may form or define a skewed quadrilateral. Furthermore, positive training samples may be identified from the outputs of the object detector 106 when skewed quadrilateral corners of anchor boxes are similar enough to the ground-truth corner locations, such as based on matching costs being less than a threshold. In an aspect of the present disclosure, various types of anchor boxes may be used to train the neural network and identify positive samples. For example, in one aspect, the predefined anchor boxes may include rectangles (e.g., rectangles). Further, the predefined anchor boxes may include rotated rectangles. In addition or instead, one or more of the anchor boxes may include skewed and rotated rectangles. Examples of skewed rectangles include irregular rectangles (e.g., no congruent angles); rhombus; kite; trapezoid; parallelogram; isosceles trapezoid; skewed quadrilateral; and any combination thereof. Predefined anchor boxes may be manually designed or obtained from ground-truth labeling and may be used to compute ground-truth displacement values used to train the object detector 106. An anchor box obtained from ground-truth labeling may be referred to as a "data-driven anchor box," which is generated by clustering or otherwise analyzing ground-truth samples. For example, ground-truth samples (e.g., including skewed quadrilaterals) may be generated for one or more images. The ground-truth samples may then be clustered into one or more clusters, and at least one data-driven anchor box may be generated, selected, and/or determined from the samples of each cluster of the one or more clusters. In some examples, a data-driven anchor box may have a shape computed from one or more of the samples of the cluster (e.g., corresponding to an average or otherwise statistically derived shape of the cluster). In various examples, spectral clustering may be executed, such as by computing the affinity matrix of ground-truth samples using a shape similarity function, and performing spectral clustering using the affinity matrix with k clusters where k is the number of clusters to be generated.

In one aspect the matching cost used to identify a positive sample from output of the object detector 106 is based at least in part on a minimum aggregate distance between the predefined anchor-box corners as adjusted by the corresponding displacement values that are output by the object detector 106 and the ground-truth corner locations. This is in contrast to determining positive samples based on intersection of union (IOU) and may be more straightforward than IOU, since the corner points being compared may not define regular rectangles (and instead define skewed quadrilaterals).

Figure 6:
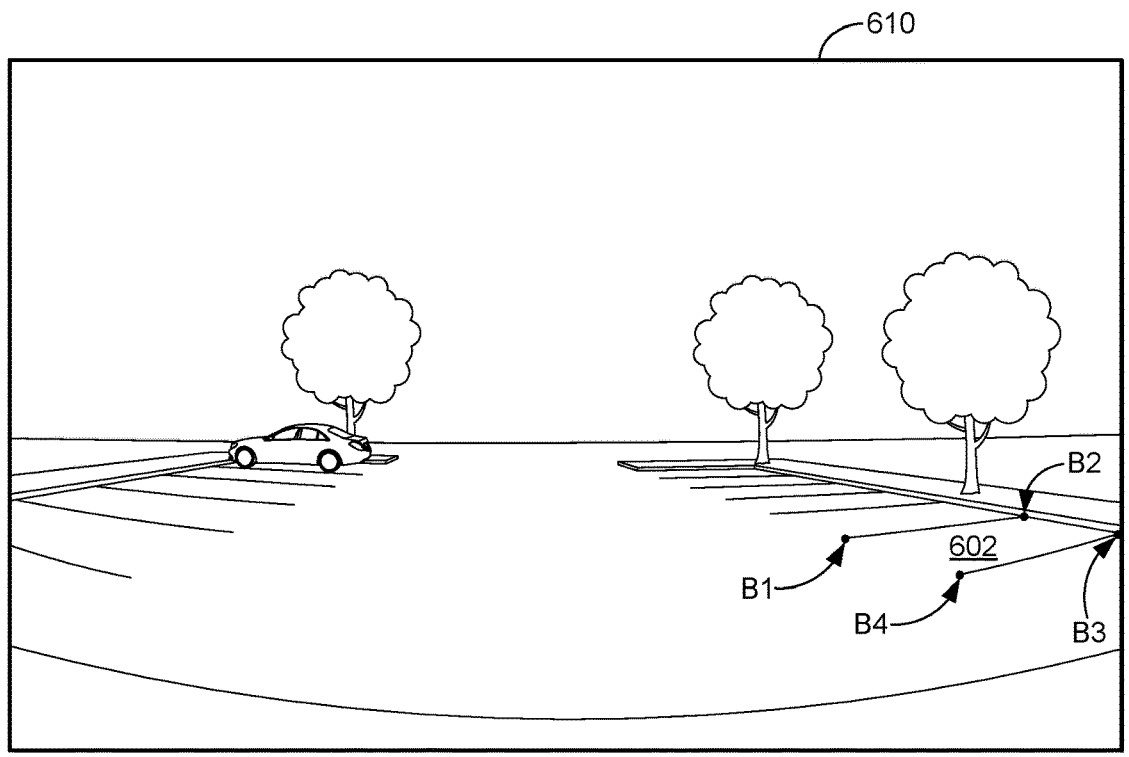
FIG. 6 is an illustration of an image with ground truth data and corner points of a skewed quadrilateral use for training of an object detector, in accordance with some embodiments of the present disclosure.
Figure 6:
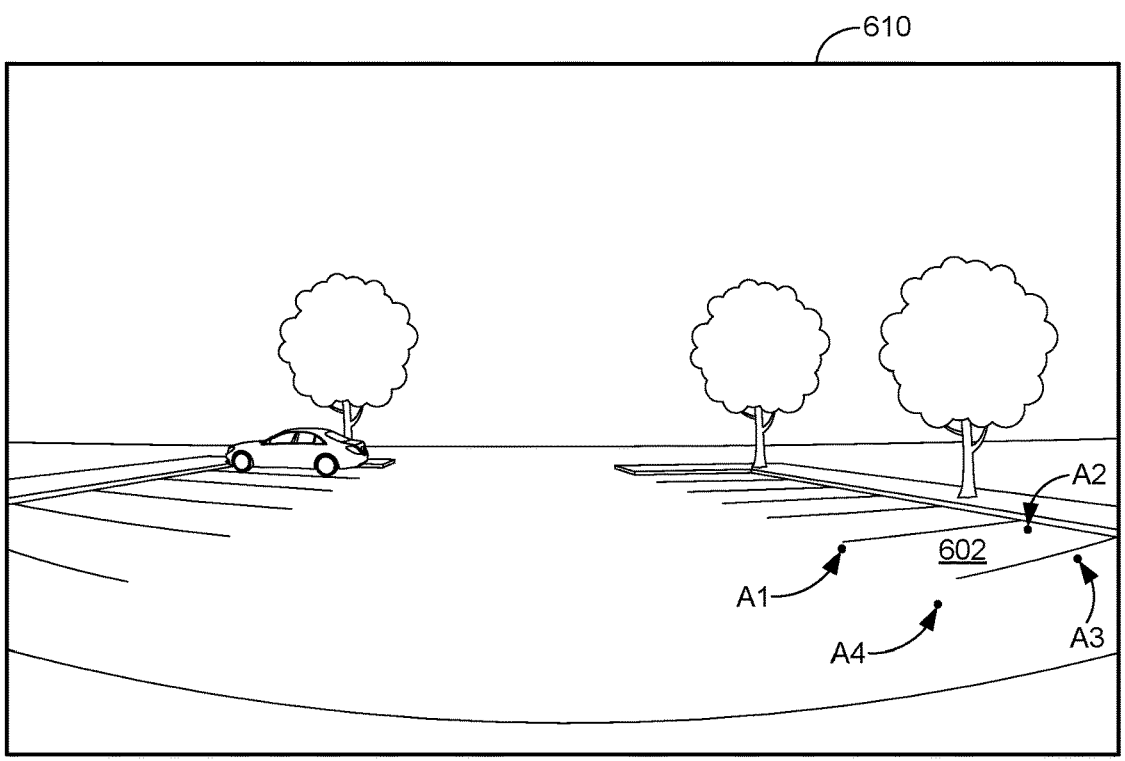
Figure 6:
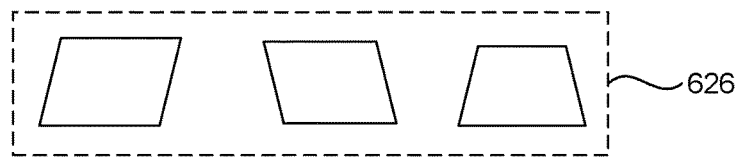

A minimum aggregate distance may be computed in various manners. For example, referring to FIG. 6, an image 610 is depicted in which ground-truth corner points (B1, B2, B3, and B4) of a depicted parking space 602 are shown. The image 610 may be used as a training input to the object detector 106. As a result, the object detector 106 may provide displacement values to corner points of an anchor box that are used to compute adjusted corner points (A1, A2, A3, and A4) of the anchor box, as shown. FIG. 6 shows corner points for only a single anchor box to simplify this illustration, and in other aspects, similar information may be used for each anchor box described herein.

In one aspect of the present disclosure, computing a minimum aggregate distance includes computing a minimum mean distance. For example, a first aggregate distance may be computed by determining distances between (A1, B1), (A2, B2), (A3, B3), and (A4, B4), then statistically deriving the first aggregate distance from those distances, such as using a mean. A second, third, and fourth aggregate distance may also be computed by changing the associations between the corner points of each data set (e.g., for each possible combination)—e.g., a second aggregate distance using (A1, B2), (A2, B3), (A3, B4), and (A4, B1); a third aggregate distance using (A1, B3), (A2, B4), (A3, B1), and (A4, B2); and a fourth aggregate distance using (A1, B4), (A2, B1), (A3, B2), and (A4, B3). A minimum aggregate distance may then be selected from among the various aggregate distances, and used to determine whether the anchor box is a positive training sample (e.g., similar to an IOU). For example, a positive sample may be selected based at least in part on the mean aggregate distance being less than a threshold value. In other aspects, an average mean distance, or other statistical quantification may be selected and used to determine whether a matching cost is less than a threshold.

In some aspects of the disclosure, the minimum aggregate distance may be determined for any number of anchor boxes associated with the object detector 106, to determine whether the anchor box corresponds to a positive sample for training. The confidence values 118 may be used to filter anchor boxes from consideration as being a positive sample. For example, the minimum aggregate distance may be determined for an anchor box based at least in part on a confidence value 118 that is associated with that anchor box. In some examples, the minimum aggregate distance may be determined for each anchor box having a confidence value 118 that exceeds a threshold value (e.g., indicating a positive detection).

In a further aspect of the disclosure, the minimum aggregate distance for each anchor box may be normalized based at least in part on a size and/or area defined by the ground-truth corner points (e.g., the ground-truth skewed quadrilateral). Normalizing the minimum aggregate distances may be used to account for size differences between anchor boxes, such as where different anchor box sizes and/or spatial element region (e.g., grid) resolutions are employed. In accordance with the disclosure, an anchor box may be identified as a positive sample when the matching cost (e.g., based at least in part on the normalized minimum aggregate distance) is less than a certain (e.g., predetermined) threshold. Positive samples may then be used to update parameters of the object detector 106 (e.g., CNN) being trained.

Figure 7:
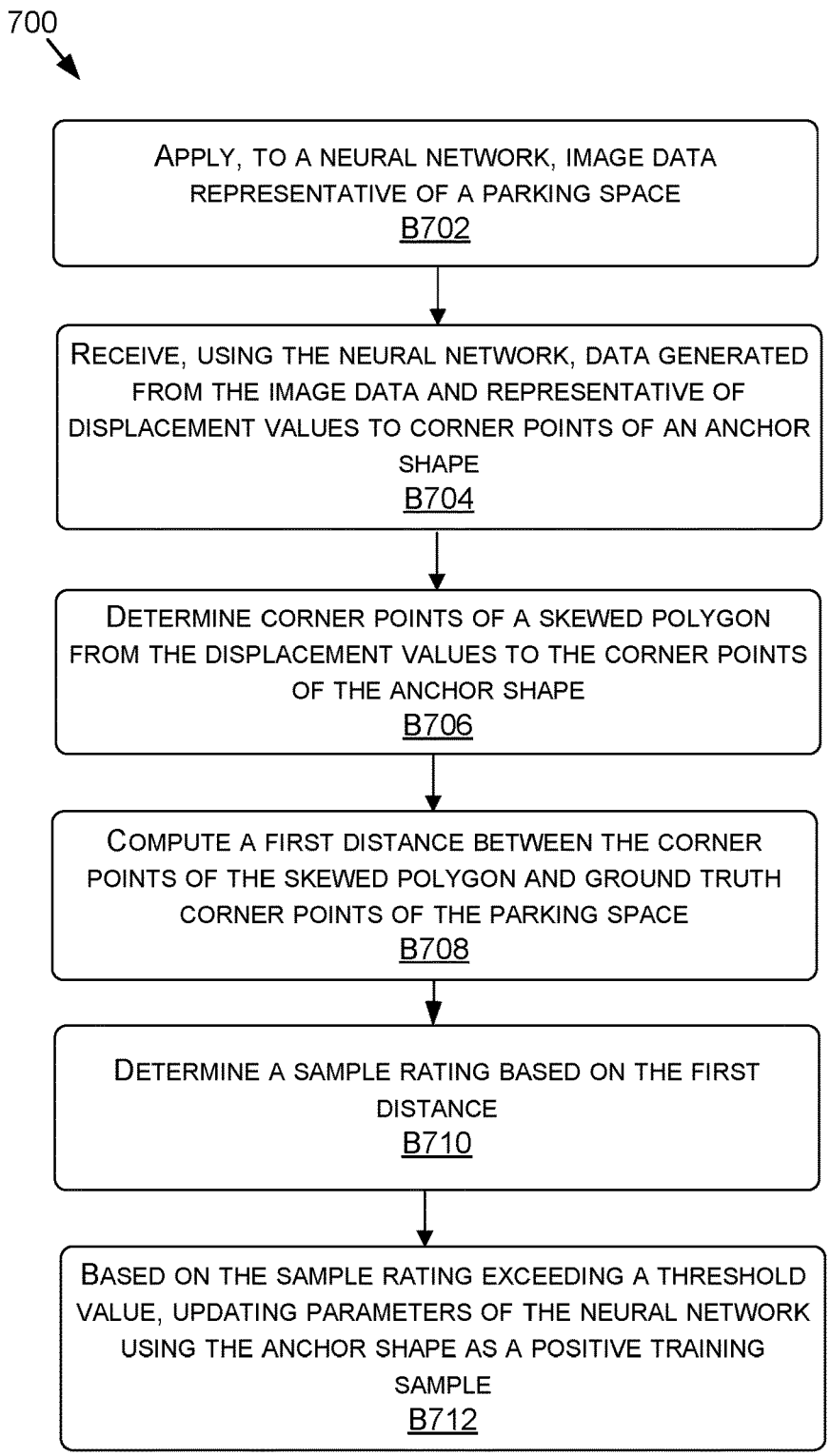
FIG. 7 is a block diagram illustrating a method of training a machine learning model to provide corner points of parking spaces, in accordance with some embodiments of the present disclosure.

Now referring to FIG. 7, FIG. 7 is a flow diagram showing a method 700 for training a machine learning model to provide corner points of parking spaces, in accordance with some embodiments of the present disclosure. Each block of the method 700, and other methods described herein, comprises a computing process that may be performed using any combination of hardware, firmware, and/or software. For instance, various functions may be carried out by a processor executing instructions stored in memory. The method 700 may also be embodied as computer-usable instructions stored on computer storage media. The method 700 may be provided by a standalone application, a service or hosted service (standalone or in combination with another hosted service), or a plug-in to another product, to name a few. Methods described herein may additionally or alternatively be executed by any one system, or any combination of systems, including, but not limited to, those described herein and are not limited to particular examples.

The method 700, at block B702, includes applying, to a neural network, image data representative of a parking space. For example, the image 502 may be applied to the object detector 106, the image 502 depicting at least one parking space.

The method 700, at block B704, includes receiving, using the neural network, data generated from the image data and representative of displacement values to corner points of an anchor shape. For example, the regression sub-network 512 may output the displacement values 516 related to the pre-defined anchor box 522 and generated from image data representing the image 502.

The method 700, at block B706, includes determining corner points of a skewed polygon from the displacement values to the corner points of the anchor shape. For example, the skewed-quadrilateral generator 518 (or other component used at least for training) may determine the adjusted corner points 520 of a skewed quadrilateral from the displacement values 516 related to the pre-defined anchor box 522.

The method 700, at block B708, includes computing a first distance between the corner points of the skewed polygon and ground-truth corner points of the parking space. For example, a minimum aggregate distance may be computed between (A1, A2, A3, and A4) and (B1, B2, B3, and B4), as described with respect to FIG. 6.

The method 700, at block B710, includes determining a sample rating based on the first distance. For example, the sample rating may be the minimum aggregate distance or some derivative thereof (e.g., normalized based on ground-truth size).

The method 700, at block B712, includes based on the sample rating exceeding (e.g., being below) a threshold value, updating parameters of the neural network using the anchor shape as a positive training sample. For example, an anchor may be defined as a positive sample when the matching cost (e.g., based on the sample rating) is less than a threshold.

Figure 8:
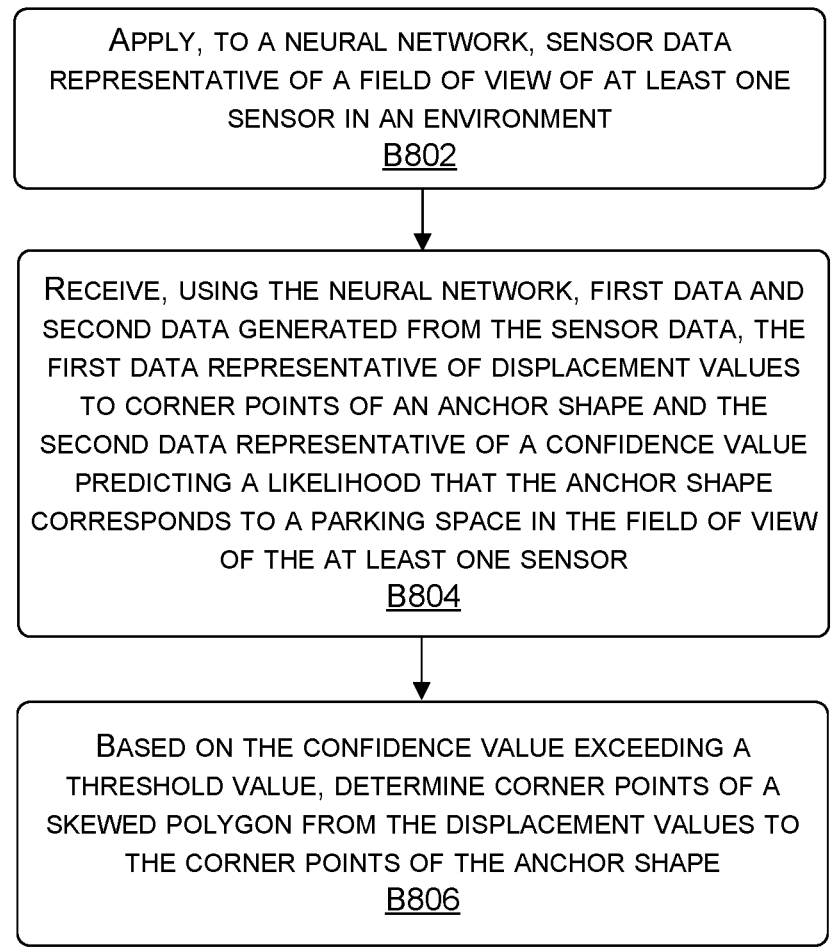
FIG. 8 is a block diagram illustrating a method for determining, using a neural network, corner points of a parking space, in accordance with some embodiments of the present disclosure.

Now referring to FIG. 8, FIG. 8 is a flow diagram showing a method 800 for determining, using a neural network, corner points of a parking space, in accordance with some embodiments of the present disclosure. The method 800, at block B802, includes applying, to a neural network, sensor data representative of a field of view of at least one sensor in an environment. For example, sensor data representative of the image 502 may be applied to the object detector 106, the image representing a field of view of a camera of the vehicle 1100.

The method 800, at block B804, includes receiving, from the neural network, first data and second data generated from the sensor data, the first data representative of displacement values to corner points of an anchor shape and the second data representative of a confidence value predicting a likelihood that the anchor shape corresponds to a parking space in the field of view of the at least one sensor. For example, the regression sub-network 512 may output data representative of the displacement values 516 related to the pre-defined anchor box 522 and generated from the sensor data representing the image 502. In addition, the classification sub-network 510 may output data representative of a confidence score 514 predicting a likelihood that the anchor box 522 corresponds to a parking space in the image 502.

The method 800, at block B806, includes based on the confidence value exceeding a threshold value, determining corner points of a skewed polygon from the displacement values to the corner points of the anchor shape. For example, the skewed-quadrilateral generator 518 may determine data representative of the adjusted corner points 520 of a skewed quadrilateral from the displacement values 516 related to the pre-defined anchor box 522 based at least in part on the confidence value 514 exceeding a threshold value, as indicated in FIG. 5A.

Figure 9:
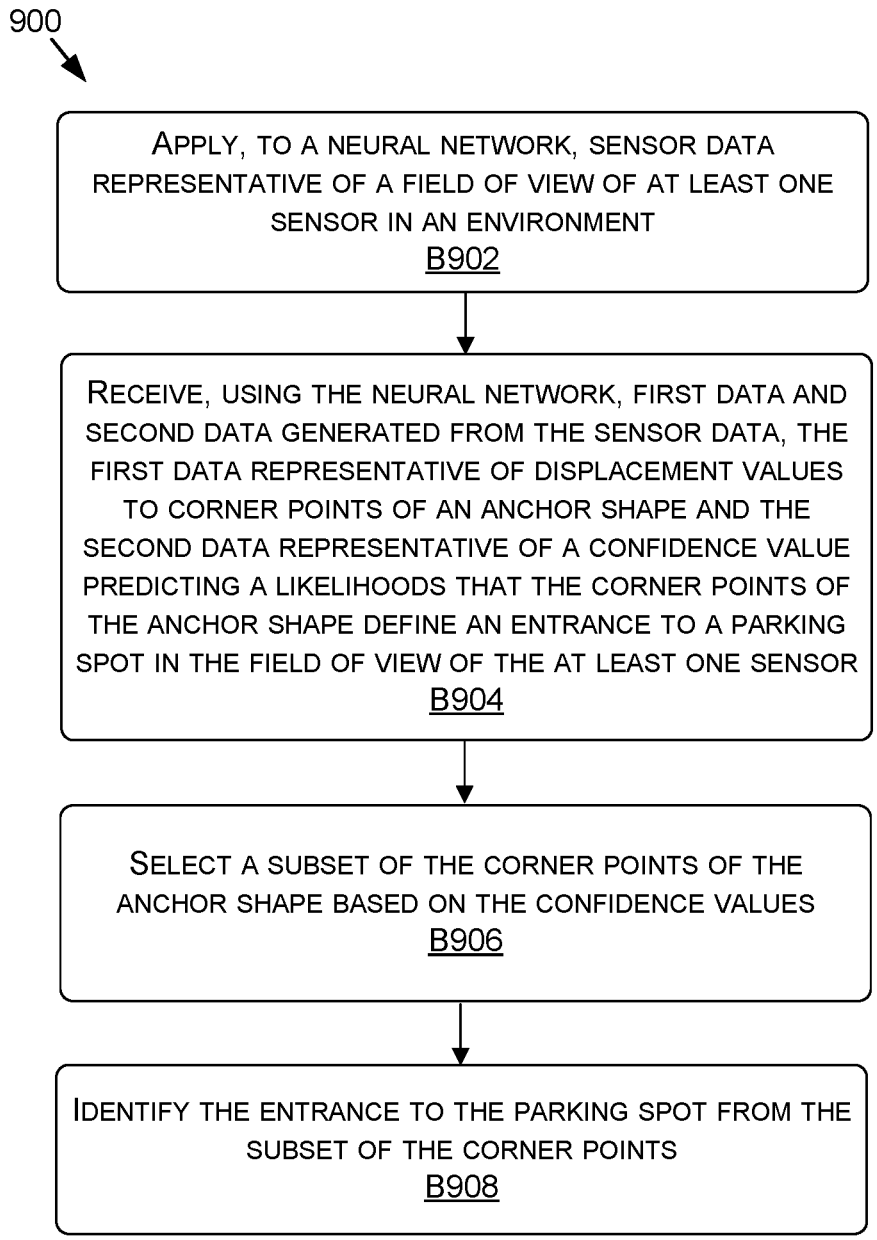
FIG. 9 is a block diagram illustrating a method of determining, using a neural network, an entrance to a parking space, in accordance with some embodiments of the present disclosure.

Now referring to FIG. 9, FIG. 9 is a flow diagram showing a method 900 for determining, using a neural network, an entrance to a parking space, in accordance with some embodiments of the present disclosure. The method 900, at block B902, includes applying, to a neural network, sensor data representative of a field of view of at least one sensor in an environment. For example, sensor data representative of the image 502 may be applied to the object detector 106, the sensor data representing a field of view of a camera of the vehicle 1100.

The method 900, at block B904, includes receiving, from the neural network, first data and second data generated from the image data. The first data is representative of displacement values to corner points of an anchor shape, and the second data is representative of confidence values predicting likelihoods that the corner points of the anchor shape define an entrance to a parking space in the field of view of the at least one sensor. For example, the regression sub-network 512 may output data representative of the displacement values 516 related to the pre-defined anchor box 522 and generated from the sensor data. In addition, the classification sub-network 510 (or another similar network) may output the confidence scores 116 of FIG. 2 predicting likelihood that corner points of the anchor box represent at least a portion of an entrance to a parking space.

The method 900, at block B906, includes selecting a subset of the corner points of the anchor shape based on the confidence values. For example, the entrance determiner 126 may filtered the corner points to determine and/or select the corner points with the highest confidence scores 116.

The method 900, at block B908, includes identifying the entrance to the parking space from the subset of the corner points. For example, once the two corner points with the highest confidence scores have been selected, the entrance determiner 126 may be designated defining an entrance and/or the entry-line for a parking space.

Example Operating Environment

The object detection system 100 and/or the network 502 may be implemented in an example operating environment 1000 of FIG. 10, in accordance with some embodiments of the present disclosure.

Among other components not illustrated, the operating environment 1000 includes a client device(s) 1020, a network(s) 1040, a server device(s) 1060, a sensor(s) 1080, and a data store(s) 1050. It should be understood that operating environment 1000 shown in FIG. 10 is an example of one suitable operating environment. Each of the components shown in FIG. 10 may be implemented via any type of computing device, such as one or more of computing device 1200 described in connection with FIG. 12, for example. These components may communicate with each other via the network 1040, which may be wired, wireless, or both. The network 1040 may include multiple networks, or a network of networks, but is shown in simple form so as not to obscure aspects of the present disclosure. By way of example, the network 1040 may include one or more wide area networks (WANs), one or more local area networks (LANs), one or more public networks such as the Internet, and/or one or more private networks. Where the network 1040 includes a wireless telecommunications network, components such as a base station, a communications tower, or even access points (as well as other components) may provide wireless connectivity. In any example, at least one network 1040 may correspond to the network(s) 1190 of FIG. 11D, described further below.

It should be understood that any number of the client devices 1020, the server devices 1060, the sensors 1080, and the data stores 1050 may be employed within the operating environment 1000 within the scope of the present disclosure. Each may be configured as a single device or multiple devices cooperating in a distributed environment.

Figure 11B:
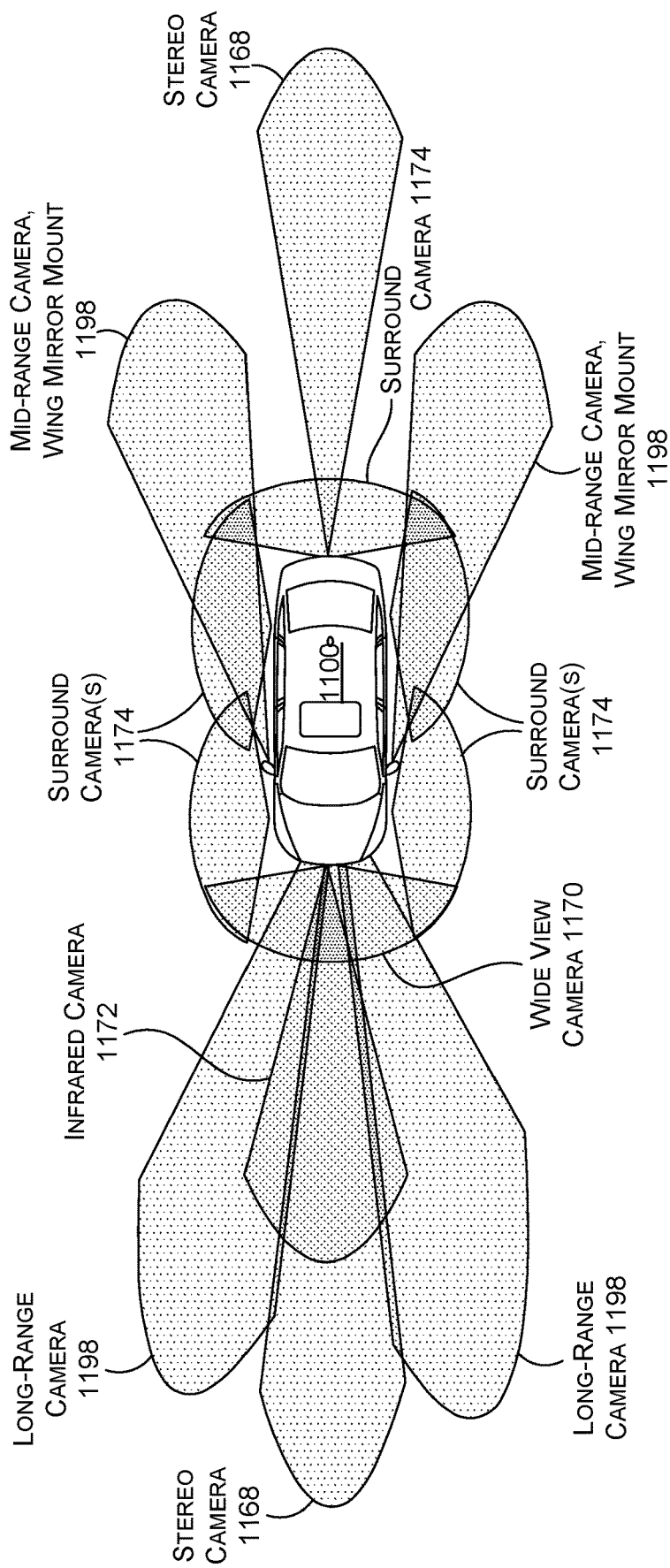
FIG. 11B is an example of camera locations and fields of view for the example autonomous vehicle of FIG. 11A, in accordance with some embodiments of the present disclosure.
Figure 11C:
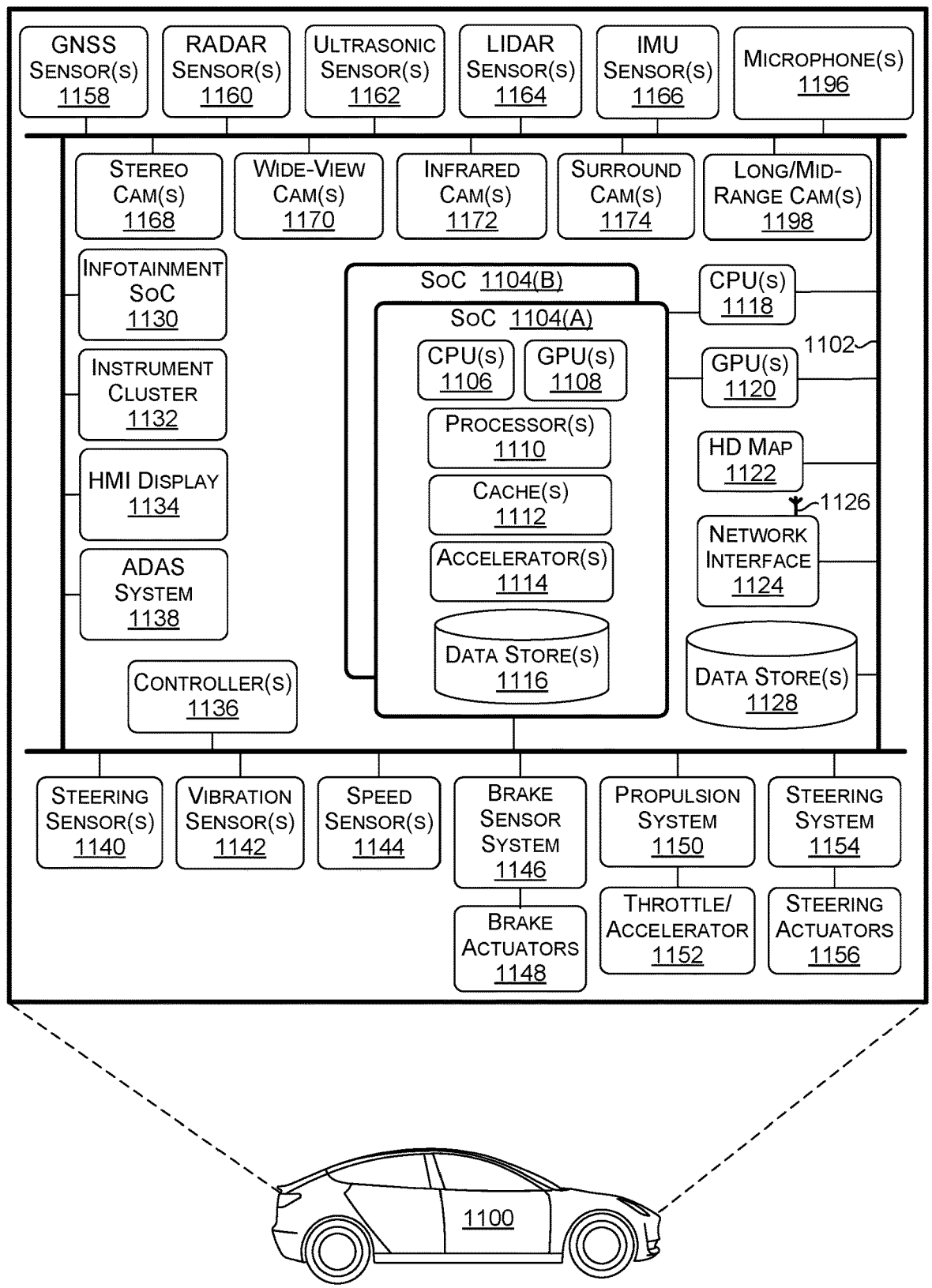
FIG. 11C is a block diagram of an example system architecture for the example autonomous vehicle of FIG. 11A, in accordance with some embodiments of the present disclosure.
Figure 11D:
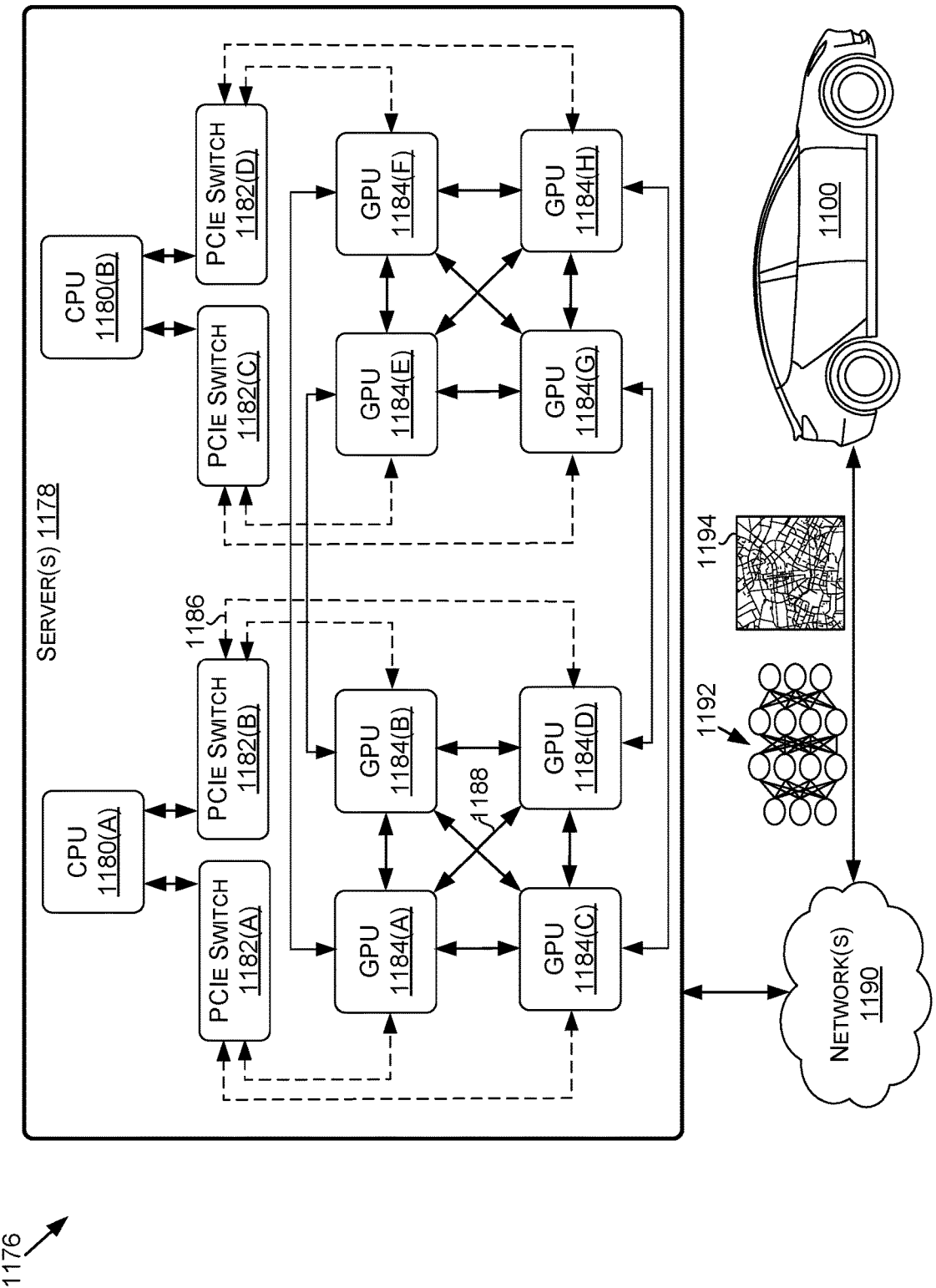
FIG. 11D is a system diagram for communication between cloud-based server(s) and the example autonomous vehicle of FIG. 11A, in accordance with some embodiments of the present disclosure.
Figure 12:
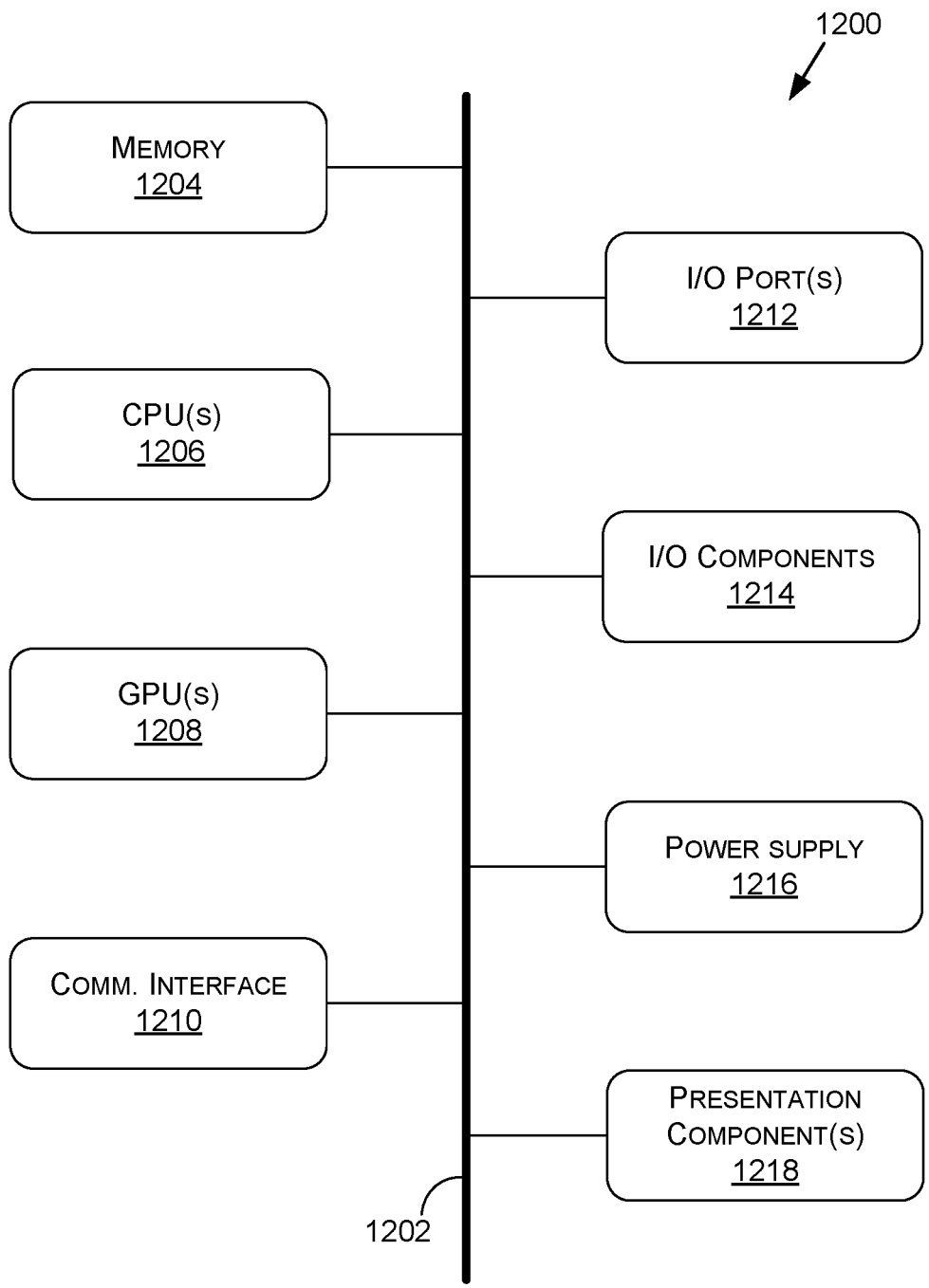
FIG. 12 is a block diagram of an example computing device suitable for use in implementing some embodiments of the present disclosure.

The client device(s) 1020 may include at least some of the components, features, and functionality of the example computing device 1200 described herein with respect to FIG. 12. By way of example and not limitation, a client device 1020 may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device. In any example, at least one client device 1020 may be part of a vehicle, such as the vehicle 1100 of FIGS. 11A-11D, described in further detail herein.

The client device(s) 1020 may include one or more processors, and one or more computer-readable media. The computer-readable media may include computer-readable instructions executable by the one or more processors. The instructions may, when executed by the one or more processors, cause the one or more processors to perform any combination and/or portion of the methods described herein and/or implement any portion of the functionality of the object detection system 100 of FIG. 1.

The server device(s) 1060 may also include one or more processors, and one or more computer-readable media. The computer-readable media includes computer-readable instructions executable by the one or more processors. The instructions may, when executed by the one or more processors, cause the one or more processors to perform any combination and/or portion of the methods described herein and/or implement any portion of the functionality of the object detection system 100 of FIG. 1. In any example, at least one server device 1060 may correspond to the server(s) 1178 of FIG. 11D, described in further detail herein.

The data store(s) 1050 may comprise one or more computer-readable media. The computer-readable media may include computer-readable instructions executable by the one or more processors. The instructions may, when executed by the one or more processors, cause the one or more processors to perform any combination and/or portion of the methods described herein and/or implement any portion of the functionality of the object detection system 100 of FIG. 1. The data store(s) 1050 (or computer data storage) is depicted as a single component, but may be embodied as one or more data stores (e.g., databases) and may be at least partially in the cloud. One or more of the data store(s) 1050 may correspond to one or more of the data stores of FIG. 11C.

Although depicted external to the server device(s) 1060 and the client device(s) 1020, the data store(s) 1050 may be at least partially embodied on any combination of the server device(s) 1060 and/or the client device(s) 1020 (e.g., as memory 1204 (FIG. 12)). For example, some information may be stored on a client device(s) 1020, and other and/or duplicate information may be stored externally (e.g., on a server device(s) 1060). Thus, it should be appreciated that information in the data store(s) 1050 may be distributed in any suitable manner across one or more data stores for storage (which may be hosted externally). For example, the data store(s) 1050 may comprise at least some of the one or more computer-readable media of the server device(s) 1060 and/or at least some of the one or more computer-readable media of the client device(s) 1020.

The sensor(s) 1080 comprise at least one sensor capable of generating sensor data representative of at least some aspect of an environment. For example, the sensor(s) 1080 may generate the sensor data 102 of FIG. 1A. The sensor(s) 1080 may comprise any combination of a global navigation satellite systems (GNSS) sensor(s) (e.g., Global Positioning System (GPS) sensor(s)), RADAR sensor(s), ultrasonic sensor(s), LIDAR sensor(s), inertial measurement unit (IMU) sensor(s) (e.g., accelerometer(s), gyro scope(s), magnetic compass(es), magnetometer(s), etc.), microphone(s), stereo camera(s), wide-view camera(s) (e.g., fisheye cameras), infrared camera(s), surround camera(s) (e.g., 360 degree cameras), long-range and/or mid-range camera(s), speed sensor(s) (e.g., for measuring the speed of the vehicle 1100), vibration sensor(s), steering sensor(s), brake sensor(s) (e.g., as part of the brake sensor system), and/or other sensor types.

With reference to FIGS. 11A-11C, the sensor data 102 may be generated by, for example and without limitation, global navigation satellite systems (GNSS) sensor(s) 1168 (e.g., Global Positioning System sensor(s)), RADAR sensor(s) 1160, ultrasonic sensor(s) 1162, LIDAR sensor(s) 1164, inertial measurement unit (IMU) sensor(s) 1166 (e.g., accelerometer(s), gyroscope(s), magnetic compass(es), magnetometer(s), etc.), microphone(s) 1196, stereo camera(s) 1168, wide-view camera(s) 1170 (e.g., fisheye cameras), infrared camera(s) 1172, surround camera(s) 1174 (e.g., 360 degree cameras), long-range and/or mid-range camera(s) 1198, speed sensor(s) 1144 (e.g., for measuring the speed of the vehicle 1100), vibration sensor(s) 1142, steering sensor(s) 1140, brake sensor(s) (e.g., as part of the brake sensor system 1146), and/or other sensor types.

In some examples, the sensor data 102 may be generated by forward-facing and/or side-facing cameras, such as a wide-view camera(s) 1170, a surround camera(s) 1174, a stereo camera(s) 1168, and/or a long-range or mid-range camera(s) 1198. In some examples, more than one camera or other sensor may be used to incorporate multiple fields of view (e.g., the field of view of the long-range cameras 1198, the forward-facing stereo camera 1168, and/or the forward facing wide-view camera 1170 of FIG. 11B).

Example Autonomous Vehicle

FIG. 11A is an illustration of an example autonomous vehicle 1100, in accordance with some embodiments of the present disclosure. The autonomous vehicle 1100 (alternatively referred to herein as the "vehicle 1100") may include a passenger vehicle, such as a car, a truck, a bus, and/or another type of vehicle that accommodates one or more passengers. Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 11, 2018, Standard No. J3016-201609, published on Sep. 30, 2016, and previous and future versions of this standard). The vehicle 1100 may be capable of functionality in accordance with one or more of Level 3-Level 5 of the autonomous driving levels. For example, the vehicle 1100 may be capable of conditional automation (Level 3), high automation (Level 4), and/or full automation (Level 5), depending on the embodiment.

The vehicle 1100 may include components such as a chassis, a vehicle body, wheels (e.g., 2, 4, 6, 8, 18, etc.), tires, axles, and other components of a vehicle. The vehicle 1100 may include a propulsion system 1150, such as an internal combustion engine, hybrid electric power plant, an all-electric engine, and/or another propulsion system type. The propulsion system 1150 may be connected to a drive train of the vehicle 1100, which may include a transmission, to enable the propulsion of the vehicle 1100. The propulsion system 1150 may be controlled in response to receiving signals from the throttle/accelerator 1152.

A steering system 1154, which may include a steering wheel, may be used to steer the vehicle 1100 (e.g., along a desired path or route) when the propulsion system 1150 is operating (e.g., when the vehicle is in motion). The steering system 1154 may receive signals from a steering actuator 1156. The steering wheel may be optional for full automation (Level 5) functionality.

The brake sensor system 1146 may be used to operate the vehicle brakes in response to receiving signals from the brake actuators 1148 and/or brake sensors.

Controller(s) 1136, which may include one or more system on chips (SoCs) 1104 (FIG. 11C) and/or GPU(s), may provide signals (e.g., representative of commands) to one or more components and/or systems of the vehicle 1100. For example, the controller(s) may send signals to operate the vehicle brakes via one or more brake actuators 1148, to operate the steering system 1154 via one or more steering actuators 1156, to operate the propulsion system 1150 via one or more throttle/accelerators 1152. The controller(s) 1136 may include one or more onboard (e.g., integrated) computing devices (e.g., supercomputers) that process sensor signals, and output operation commands (e.g., signals representing commands) to enable autonomous driving and/or to assist a human driver in driving the vehicle 1100. The controller(s) 1136 may include a first controller 1136 for autonomous driving functions, a second controller 1136 for functional safety functions, a third controller 1136 for artificial intelligence functionality (e.g., computer vision), a fourth controller 1136 for infotainment functionality, a fifth controller 1136 for redundancy in emergency conditions, and/or other controllers. In some examples, a single controller 1136 may handle two or more of the above functionalities, two or more controllers 1136 may handle a single functionality, and/or any combination thereof.

The controller(s) 1136 may provide the signals for controlling one or more components and/or systems of the vehicle 1100 in response to sensor data received from one or more sensors (e.g., sensor inputs). The sensor data may be received from, for example and without limitation, global navigation satellite systems sensor(s) 1158 (e.g., Global Positioning System sensor(s)), RADAR sensor(s) 1160, ultrasonic sensor(s) 1162, LIDAR sensor(s) 1164, inertial measurement unit (IMU) sensor(s) 1166 (e.g., accelerometer(s), gyro scope(s), magnetic compass(es), magnetometer(s), etc.), microphone(s) 1196, stereo camera(s) 1168, wide-view camera(s) 1170 (e.g., fisheye cameras), infrared camera(s) 1172, surround camera(s) 1174 (e.g., 360 degree cameras), long-range and/or mid-range camera(s) 1198, speed sensor(s) 1144 (e.g., for measuring the speed of the vehicle 1100), vibration sensor(s) 1142, steering sensor(s) 1140, brake sensor(s) (e.g., as part of the brake sensor system 1146), and/or other sensor types.

One or more of the controller(s) 1136 may receive inputs (e.g., represented by input data) from an instrument cluster 1132 of the vehicle 1100 and provide outputs (e.g., represented by output data, display data, etc.) via a human-machine interface (HMI) display 1134, an audible annunciator, a loudspeaker, and/or via other components of the vehicle 1100. The outputs may include information such as vehicle velocity, speed, time, map data (e.g., the HD map 1122 of FIG. 11C), location data (e.g., the vehicle's 1100 location, such as on a map), direction, location of other vehicles (e.g., an occupancy grid), information about objects and status of objects as perceived by the controller(s) 1136, etc. For example, the HMI display 1134 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1100 further includes a network interface 1124 which may use one or more wireless antenna(s) 1126 and/or modem(s) to communicate over one or more networks. For example, the network interface 1124 may be capable of communication over LTE, WCDMA, UMTS, GSM, CDMA2000, etc. The wireless antenna(s) 1126 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LP-WANs), such as LoRaWAN, SigFox, etc.

FIG. 11B is an example of camera locations and fields of view for the example autonomous vehicle 1100 of FIG. 11A, in accordance with some embodiments of the present disclosure. The cameras and respective fields of view are one example embodiment and are not intended to be limiting. For example, additional and/or alternative cameras may be included and/or the cameras may be located at different locations on the vehicle 1100.

The camera types for the cameras may include, but are not limited to, digital cameras that may be adapted for use with the components and/or systems of the vehicle 1100. The camera(s) may operate at automotive safety integrity level (ASIL) B and/or at another ASIL. The camera types may be capable of any image capture rate, such as 60 frames per second (fps), 1120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-minor assemblies may be custom 3-D printed so that the camera mounting plate matches the shape of the wing-minor. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1100 (e.g., front-facing cameras) may be used for surround view, to help identify forward facing paths and obstacles, as well aid in, with the help of one or more controllers 1136 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1170 that may be used to perceive objects coming into view from the periphery (e.g., pedestrians, crossing traffic or bicycles). Although only one wide-view camera is illustrated in FIG. 11B, there may any number of wide-view cameras 1170 on the vehicle 1100. In addition, long-range camera(s) 1198 (e.g., a long-view stereo camera pair) may be used for depth-based object detection, especially for objects for which a neural network has not yet been trained. The long-range camera(s) 1198 may also be used for object detection and classification, as well as basic object tracking.

One or more stereo cameras 1168 may also be included in a front-facing configuration. The stereo camera(s) 1168 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1168 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1168 may be used in addition to, or alternatively from, those described herein.

Cameras with a field of view that include portions of the environment to the side of the vehicle 1100 (e.g., side-view cameras) may be used for surround view, providing information used to create and update the occupancy grid, as well as to generate side impact collision warnings. For example, surround camera(s) 1174 (e.g., four surround cameras 1174 as illustrated in FIG. 11B) may be positioned to on the vehicle 1100. The surround camera(s) 1174 may include wide-view camera(s) 1170, fisheye camera(s), 360 degree camera(s), and/or the like. Four example, four fisheye cameras may be positioned on the vehicle's front, rear, and sides. In an alternative arrangement, the vehicle may use three surround camera(s) 1174 (e.g., left, right, and rear), and may leverage one or more other camera(s) (e.g., a forward-facing camera) as a fourth surround view camera.

Cameras with a field of view that include portions of the environment to the rear of the vehicle 1100 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1198, stereo camera(s) 1168), infrared camera(s) 1172, etc.), as described herein.

FIG. 11C is a block diagram of an example system architecture for the example autonomous vehicle 1100 of FIG. 11A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1100 in FIG. 11C are illustrated as being connected via bus 1102. The bus 1102 may include a Controller Area Network (CAN) data interface (alternatively referred to herein as a "CAN bus"). A CAN may be a network inside the vehicle 1100 used to aid in control of various features and functionality of the vehicle 1100, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1102 is described herein as being a CAN bus, this is not intended to be limiting. For example, in addition to, or alternatively from, the CAN bus, FlexRay and/or Ethernet may be used. Additionally, although a single line is used to represent the bus 1102, this is not intended to be limiting. For example, there may be any number of busses 1102, which may include one or more CAN busses, one or more FlexRay busses, one or more Ethernet busses, and/or one or more other types of busses using a different protocol. In some examples, two or more busses 1102 may be used to perform different functions, and/or may be used for redundancy. For example, a first bus 1102 may be used for collision avoidance functionality and a second bus 1102 may be used for actuation control. In any example, each bus 1102 may communicate with any of the components of the vehicle 1100, and two or more busses 1102 may communicate with the same components. In some examples, each SoC 1104, each controller 1136, and/or each computer within the vehicle may have access to the same input data (e.g., inputs from sensors of the vehicle 1100), and may be connected to a common bus, such the CAN bus.

The vehicle 1100 may include one or more controller(s) 1136, such as those described herein with respect to FIG. 11A. The controller(s) 1136 may be used for a variety of functions. The controller(s) 1136 may be coupled to any of the various other components and systems of the vehicle 1100, and may be used for control of the vehicle 1100, artificial intelligence of the vehicle 1100, infotainment for the vehicle 1100, and/or the like.

The vehicle 1100 may include a system(s) on a chip (SoC) 1104. The SoC 1104 may include CPU(s) 1106, GPU(s) 1108, processor(s) 1110, cache(s) 1112, accelerator(s) 1114, data store(s) 1116, and/or other components and features not illustrated. The SoC(s) 1104 may be used to control the vehicle 1100 in a variety of platforms and systems. For example, the SoC(s) 1104 may be combined in a system (e.g., the system of the vehicle 1100) with an HD map 1122 which may obtain map refreshes and/or updates via a network interface 1124 from one or more servers (e.g., server(s) 1178 of FIG. 11D).

The CPU(s) 1106 may include a CPU cluster or CPU complex (alternatively referred to herein as a "CCPLEX"). The CPU(s) 1106 may include multiple cores and/or L2 caches. For example, in some embodiments, the CPU(s) 1106 may include eight cores in a coherent multi-processor configuration. In some embodiments, the CPU(s) 1106 may include four dual-core clusters where each cluster has a dedicated L2 cache (e.g., a 2 MB L2 cache). The CPU(s) 1106 (e.g., the CCPLEX) may be configured to support simultaneous cluster operation enabling any combination of the clusters of the CPU(s) 1106 to be active at any given time.

The CPU(s) 1106 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster can be independently power-gated when all cores are power-gated. The CPU(s) 1106 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1108 may include an integrated GPU (alternatively referred to herein as an "iGPU"). The GPU(s) 1108 may be programmable and may be efficient for parallel workloads. The GPU(s) 1108, in some examples, may use an enhanced tensor instruction set. The GPU(s) 1108 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1108 may include at least eight streaming microprocessors. The GPU(s) 1108 may use compute application programming interface(s) (API(s)). In addition, the GPU(s) 1108 may use one or more parallel computing platforms and/or programming models (e.g., NVIDIA's CUDA).

The GPU(s) 1108 may be power-optimized for best performance in automotive and embedded use cases. For example, the GPU(s) 1108 may be fabricated on a Fin field-effect transistor (FinFET). However, this is not intended to be limiting and the GPU(s) 1108 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1108 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1108 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1108 to access the CPU(s) 1106 page tables directly. In such examples, when the GPU(s) 1108 memory management unit (MMU) experiences a miss, an address translation request may be transmitted to the CPU(s) 1106. In response, the CPU(s) 1106 may look in its page tables for the virtual-to-physical mapping for the address and transmits the translation back to the GPU(s) 1108. As such, unified memory technology may allow a single unified virtual address space for memory of both the CPU(s) 1106 and the GPU(s) 1108, thereby simplifying the GPU(s) 1108 programming and porting of applications to the GPU(s) 1108.

In addition, the GPU(s) 1108 may include an access counter that may keep track of the frequency of access of the GPU(s) 1108 to memory of other processors. The access counter may help ensure that memory pages are moved to the physical memory of the processor that is accessing the pages most frequently.

The SoC(s) 1104 may include any number of cache(s) 1112, including those described herein. For example, the cache(s) 1112 may include an L3 cache that is available to both the CPU(s) 1106 and the GPU(s) 1108 (e.g., that is connected both the CPU(s) 1106 and the GPU(s) 1108). The cache(s) 1112 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1104 may include one or more accelerators 1114 (e.g., hardware accelerators, software accelerators, or a combination thereof). For example, the SoC(s) 1104 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1108 and to off-load some of the tasks of the GPU(s) 1108 (e.g., to free up more cycles of the GPU(s) 1108 for performing other tasks). As an example, the accelerator(s) 1114 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1114 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1108, and by using an inference accelerator, for example, a designer may target either the DLA(s) or the GPU(s) 1108 for any function. For example, the designer may focus processing of CNNs and floating point operations on the DLA(s) and leave other functions to the GPU(s) 1108 and/or other accelerator(s) 1114.

The accelerator(s) 1114 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1106. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1114 (e.g., the hardware acceleration cluster) may include a computer vision network on-chip and SRAM, for providing a high-bandwidth, low latency SRAM for the accelerator(s) 1114. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 612508 standards, although other standards and protocols may be used.

In some examples, the SoC(s) 1104 may include a real-time ray-tracing hardware accelerator, such as described in U.S. patent application Ser. No. 16/101,1232, filed on Aug. 10, 2018. The real-time ray-tracing hardware accelerator may be used to quickly and efficiently determine the positions and extents of objects (e.g., within a world model), to generate real0time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 1114 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1166 output that correlates with the vehicle 1100 orientation, distance, 3D location estimates of the object obtained from the neural network and/or other sensors (e.g., LIDAR sensor(s) 1164 or RADAR sensor(s) 1160), among others.

The SoC(s) 1104 may include data store(s) 1116 (e.g., memory). The data store(s) 1116 may be on-chip memory of the SoC(s) 1104, which may store neural networks to be executed on the GPU and/or the DLA. In some examples, the data store(s) 1116 may be large enough in capacity to store multiple instances of neural networks for redundancy and safety. The data store(s) 1112 may comprise L2 or L3 cache(s) 1112. Reference to the data store(s) 1116 may include reference to the memory associated with the PVA, DLA, and/or other accelerator(s) 1114, as described herein.

The SoC(s) 1104 may include one or more processor(s) 1110 (e.g., embedded processors). The processor(s) 1110 may include a boot and power management processor that may be a dedicated processor and subsystem to handle boot power and management functions and related security enforcement. The boot and power management processor may be a part of the SoC(s) 1104 boot sequence and may provide runtime power management services. The boot power and management processor may provide clock and voltage programming, assistance in system low power state transitions, management of SoC(s) 1104 thermals and temperature sensors, and/or management of the SoC(s) 1104 power states. Each temperature sensor may be implemented as a ring-oscillator whose output frequency is proportional to temperature, and the SoC(s) 1104 may use the ring-oscillators to detect temperatures of the CPU(s) 1106, GPU(s) 1108, and/or accelerator(s) 1114. If temperatures are determined to exceed a threshold, the boot and power management processor may enter a temperature fault routine and put the SoC(s) 1104 into a lower power state and/or put the vehicle 1100 into a chauffeur to safe stop mode (e.g., bring the vehicle 1100 to a safe stop).

The processor(s) 1110 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1110 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1110 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1110 may further include a real-time camera engine that may include a dedicated processor subsystem for handling real-time camera management.

The processor(s) 1110 may further include a high-dynamic range signal processor that may include an image signal processor that is a hardware engine that is part of the camera processing pipeline.

The processor(s) 1110 may include a video image compositor that may be a processing block (e.g., implemented on a microprocessor) that implements video post-processing functions needed by a video playback application to produce the final image for the player window. The video image compositor may perform lens distortion correction on wide-view camera(s) 1170, surround camera(s) 1174, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1108 is not required to continuously render new surfaces. Even when the GPU(s) 1108 is powered on and active doing 3D rendering, the video image compositor may be used to offload the GPU(s) 1108 to improve performance and responsiveness.

The SoC(s) 1104 may further include a mobile industry processor interface (MIPI) camera serial interface for receiving video and input from cameras, a high-speed interface, and/or a video input block that may be used for camera and related pixel input functions. The SoC(s) 1104 may further include an input/output controller(s) that may be controlled by software and may be used for receiving I/O signals that are uncommitted to a specific role.

The SoC(s) 1104 may further include a broad range of peripheral interfaces to enable communication with peripherals, audio codecs, power management, and/or other devices. The SoC(s) 1104 may be used to process data from cameras (e.g., connected over Gigabit Multimedia Serial Link and Ethernet), sensors (e.g., LIDAR sensor(s) 1164, RADAR sensor(s) 1160, etc. that may be connected over Ethernet), data from bus 1102 (e.g., speed of vehicle 1100, steering wheel position, etc.), data from GNSS sensor(s) 1158 (e.g., connected over Ethernet or CAN bus). The SoC(s) 1104 may further include dedicated high-performance mass storage controllers that may include their own DMA engines, and that may be used to free the CPU(s) 1106 from routine data management tasks.

The SoC(s) 1104 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1104 may be faster, more reliable, and even more energy-efficient and space-efficient than conventional systems. For example, the accelerator(s) 1114, when combined with the CPU(s) 1106, the GPU(s) 1108, and the data store(s) 1116, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1120) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1108.

In some examples, a CNN for facial recognition and vehicle owner identification may use data from camera sensors to identify the presence of an authorized driver and/or owner of the vehicle 1100. The always on sensor processing engine may be used to unlock the vehicle when the owner approaches the driver door and turn on the lights, and, in security mode, to disable the vehicle when the owner leaves the vehicle. In this way, the SoC(s) 1104 provide for security against theft and/or carjacking.

In another example, a CNN for emergency vehicle detection and identification may use data from microphones 1196 to detect and identify emergency vehicle sirens. In contrast to conventional systems, that use general classifiers to detect sirens and manually extract features, the SoC(s) 1104 use the CNN for classifying environmental and urban sounds, as well as classifying visual data. In a preferred embodiment, the CNN running on the DLA is trained to identify the relative closing speed of the emergency vehicle (e.g., by using the Doppler effect). The CNN may also be trained to identify emergency vehicles specific to the local area in which the vehicle is operating, as identified by GNSS sensor(s) 1158. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1162, until the emergency vehicle(s) passes.

The vehicle may include a CPU(s) 1118 (e.g., discrete CPU(s), or dCPU(s)), that may be coupled to the SoC(s) 1104 via a high-speed interconnect (e.g., PCIe). The CPU(s) 1118 may include an X86 processor, for example. The CPU(s) 1118 may be used to perform any of a variety of functions, including arbitrating potentially inconsistent results between ADAS sensors and the SoC(s) 1104, and/or monitoring the status and health of the controller(s) 1136 and/or infotainment SoC 1130, for example.

The vehicle 1100 may include a GPU(s) 1120 (e.g., discrete GPU(s), or dGPU(s)), that may be coupled to the SoC(s) 1104 via a high-speed interconnect (e.g., NVIDIA's NVLINK). The GPU(s) 1120 may provide additional artificial intelligence functionality, such as by executing redundant and/or different neural networks, and may be used to train and/or update neural networks based at least in part on input (e.g., sensor data) from sensors of the vehicle 1100.

The vehicle 1100 may further include the network interface 1124 which may include one or more wireless antennas 1126 (e.g., one or more wireless antennas for different communication protocols, such as a cellular antenna, a Bluetooth antenna, etc.). The network interface 1124 may be used to enable wireless connectivity over the Internet with the cloud (e.g., with the server(s) 1178 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1100 information about vehicles in proximity to the vehicle 1100 (e.g., vehicles in front of, on the side of, and/or behind the vehicle 1100). This functionality may be part of a cooperative adaptive cruise control functionality of the vehicle 1100.

The network interface 1124 may include a SoC that provides modulation and demodulation functionality and enables the controller(s) 1136 to communicate over wireless networks. The network interface 1124 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1100 may further include data store(s) 1128 which may include off-chip (e.g., off the SoC(s) 1104) storage. The data store(s) 1128 may include one or more storage elements including RAM, SRAM, DRAM, VRAM, Flash, hard disks, and/or other components and/or devices that may store at least one bit of data.

The vehicle 1100 may further include GNSS sensor(s) 1158. The GNSS sensor(s) 1158 (e.g., GPS and/or assisted GPS sensors), to assist in mapping, perception, occupancy grid generation, and/or path planning functions. Any number of GNSS sensor(s) 1158 may be used, including, for example and without limitation, a GPS using a USB connector with an Ethernet to Serial (RS-232) bridge.

The vehicle 1100 may further include RADAR sensor(s) 1160. The RADAR sensor(s) 1160 may be used by the vehicle 1100 for long-range vehicle detection, even in darkness and/or severe weather conditions. RADAR functional safety levels may be ASIL B. The RADAR sensor(s) 1160 may use the CAN and/or the bus 1102 (e.g., to transmit data generated by the RADAR sensor(s) 1160) for control and to access object tracking data, with access to Ethernet to access raw data in some examples. A wide variety of RADAR sensor types may be used. For example, and without limitation, the RADAR sensor(s) 1160 may be suitable for front, rear, and side RADAR use. In some example, Pulse Doppler RADAR sensor(s) are used.

The RADAR sensor(s) 1160 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250m range. The RADAR sensor(s) 1160 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1100 surroundings at higher speeds with minimal interference from traffic in adjacent lanes. The other two antennae may expand the field of view, making it possible to quickly detect vehicles entering or leaving the vehicle's 1100 lane.

Mid-range RADAR systems may include, as an example, a range of up to 1460m (front) or 80m (rear), and a field of view of up to 42 degrees (front) or 1450 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1100 may further include ultrasonic sensor(s) 1162. The ultrasonic sensor(s) 1162, which may be positioned at the front, back, and/or the sides of the vehicle 1100, may be used for park assist and/or to create and update an occupancy grid. A wide variety of ultrasonic sensor(s) 1162 may be used, and different ultrasonic sensor(s) 1162 may be used for different ranges of detection (e.g., 2.5m, 4m). The ultrasonic sensor(s) 1162 may operate at functional safety levels of ASIL B.

The vehicle 1100 may include LIDAR sensor(s) 1164. The LIDAR sensor(s) 1164 may be used for object and pedestrian detection, emergency braking, collision avoidance, and/or other functions. The LIDAR sensor(s) 1164 may be functional safety level ASIL B. In some examples, the vehicle 1100 may include multiple LIDAR sensors 1164 (e.g., two, four, six, etc.) that may use Ethernet (e.g., to provide data to a Gigabit Ethernet switch).

In some examples, the LIDAR sensor(s) 1164 may be capable of providing a list of objects and their distances for a 360-degree field of view. Commercially available LIDAR sensor(s) 1164 may have an advertised range of approximately 1400m, with an accuracy of 2 cm-3 cm, and with support for a 1400 Mbps Ethernet connection, for example. In some examples, one or more non-protruding LIDAR sensors 1164 may be used. In such examples, the LIDAR sensor(s) 1164 may be implemented as a small device that may be embedded into the front, rear, sides, and/or corners of the vehicle 1100. The LIDAR sensor(s) 1164, in such examples, may provide up to a 1420-degree horizontal and 35-degree vertical field-of-view, with a 200m range even for low-reflectivity objects. Front-mounted LIDAR sensor(s) 1164 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1100. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1164 may be less susceptible to motion blur, vibration, and/or shock.

The vehicle may further include IMU sensor(s) 1166. The IMU sensor(s) 1166 may be located at a center of the rear axle of the vehicle 1100, in some examples. The IMU sensor(s) 1166 may include, for example and without limitation, an accelerometer(s), a magnetometer(s), a gyroscope(s), a magnetic compass(es), and/or other sensor types. In some examples, such as in six-axis applications, the IMU sensor(s) 1166 may include accelerometers and gyroscopes, while in nine-axis applications, the IMU sensor(s) 1166 may include accelerometers, gyroscopes, and magnetometers.

In some embodiments, the IMU sensor(s) 1166 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1166 may enable the vehicle 1100 to estimate heading without requiring input from a magnetic sensor by directly observing and correlating the changes in velocity from GPS to the IMU sensor(s) 1166. In some examples, the IMU sensor(s) 1166 and the GNSS sensor(s) 1158 may be combined in a single integrated unit.

The vehicle may include microphone(s) 1196 placed in and/or around the vehicle 1100. The microphone(s) 1196 may be used for emergency vehicle detection and identification, among other things.

The vehicle may further include any number of camera types, including stereo camera(s) 1168, wide-view camera(s) 1170, infrared camera(s) 1172, surround camera(s) 1174, long-range and/or mid-range camera(s) 1198, and/or other camera types. The cameras may be used to capture image data around an entire periphery of the vehicle 1100. The types of cameras used depends on the embodiments and requirements for the vehicle 1100, and any combination of camera types may be used to provide the necessary coverage around the vehicle 1100. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 11A and FIG. 11B.

The vehicle 1100 may further include vibration sensor(s) 1142. The vibration sensor(s) 1142 may measure vibrations of components of the vehicle, such as the axle(s). For example, changes in vibrations may indicate a change in road surfaces. In another example, when two or more vibration sensors 1142 are used, the differences between the vibrations may be used to determine friction or slippage of the road surface (e.g., when the difference in vibration is between a power-driven axle and a freely rotating axle).

The vehicle 1100 may include an ADAS system 1138. The ADAS system 1138 may include a SoC, in some examples. The ADAS system 1138 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1160, LIDAR sensor(s) 1164, and/or a camera(s). The ACC systems may include longitudinal ACC and/or lateral ACC. Longitudinal ACC monitors and controls the distance to the vehicle immediately ahead of the vehicle 1100 and automatically adjust the vehicle speed to maintain a safe distance from vehicles ahead. Lateral ACC performs distance keeping, and advises the vehicle 1100 to change lanes when necessary. Lateral ACC is related to other ADAS applications such as LCA and CWS.

CACC uses information from other vehicles that may be received via the network interface 1124 and/or the wireless antenna(s) 1126 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link In general, the V2V communication concept provides information about the immediately preceding vehicles (e.g., vehicles immediately ahead of and in the same lane as the vehicle 1100), while the I2V communication concept provides information about traffic further ahead. CACC systems may include either or both I2V and V2V information sources. Given the information of the vehicles ahead of the vehicle 1100, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1160, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1160, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1100 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1100 if the vehicle 1100 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1160, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1100 is backing up. Some RCTW systems include AEB to ensure that the vehicle brakes are applied to avoid a crash. RCTW systems may use one or more rear-facing RADAR sensor(s) 1160, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1100, the vehicle 1100 itself must, in the case of conflicting results, decide whether to heed the result from a primary computer or a secondary computer (e.g., a first controller 1136 or a second controller 1136). For example, in some embodiments, the ADAS system 1138 may be a backup and/or secondary computer for providing perception information to a backup computer rationality module. The backup computer rationality monitor may run a redundant diverse software on hardware components to detect faults in perception and dynamic driving tasks. Outputs from the ADAS system 1138 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based at least in part on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1104.

In other examples, ADAS system 1138 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1138 may be fed into the primary computer's perception block and/or the primary computer's dynamic driving task block. For example, if the ADAS system 1138 indicates a forward crash warning due to an object immediately ahead, the perception block may use this information when identifying objects. In other examples, the secondary computer may have its own neural network which is trained and thus reduces the risk of false positives, as described herein.

The vehicle 1100 may further include the infotainment SoC 1130 (e.g., an in-vehicle infotainment system (IVI)). Although illustrated and described as a SoC, the infotainment system may not be a SoC, and may include two or more discrete components. The infotainment SoC 1130 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to the vehicle 1100. For example, the infotainment SoC 1130 may radios, disk players, navigation systems, video players, USB and Bluetooth connectivity, carputers, in-car entertainment, WiFi, steering wheel audio controls, hands free voice control, a heads-up display (HUD), an HMI display 1134, a telematics device, a control panel (e.g., for controlling and/or interacting with various components, features, and/or systems), and/or other components. The infotainment SoC 1130 may further be used to provide information (e.g., visual and/or audible) to a user(s) of the vehicle, such as information from the ADAS system 1138, autonomous driving information such as planned vehicle maneuvers, trajectories, surrounding environment information (e.g., intersection information, vehicle information, road information, etc.), and/or other information.

The infotainment SoC 1130 may include GPU functionality. The infotainment SoC 1130 may communicate over the bus 1102 (e.g., CAN bus, Ethernet, etc.) with other devices, systems, and/or components of the vehicle 1100. In some examples, the infotainment SoC 1130 may be coupled to a supervisory MCU such that the GPU of the infotainment system may perform some self-driving functions in the event that the primary controller(s) 1136 (e.g., the primary and/or backup computers of the vehicle 1100) fail. In such an example, the infotainment SoC 1130 may put the vehicle 1100 into a chauffeur to safe stop mode, as described herein.

The vehicle 1100 may further include an instrument cluster 1132 (e.g., a digital dash, an electronic instrument cluster, a digital instrument panel, etc.). The instrument cluster 1132 may include a controller and/or supercomputer (e.g., a discrete controller or supercomputer). The instrument cluster 1132 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1130 and the instrument cluster 1132. In other words, the instrument cluster 1132 may be included as part of the infotainment SoC 1130, or vice versa.

FIG. 11D is a system diagram for communication between cloud-based server(s) and the example autonomous vehicle 1100 of FIG. 11A, in accordance with some embodiments of the present disclosure. The system 1176 may include server(s) 1178, network(s) 1190, and vehicles, including the vehicle 1100. The server(s) 1178 may include a plurality of GPUs 1184(A)-1284(H) (collectively referred to herein as GPUs 1184), PCIe switches 1182(A)-1182(H) (collectively referred to herein as PCIe switches 1182), and/or CPUs 1180(A)-1180(B) (collectively referred to herein as CPUs 1180). The GPUs 1184, the CPUs 1180, and the PCIe switches may be interconnected with high-speed interconnects such as, for example and without limitation, NVLink interfaces 1188 developed by NVIDIA and/or PCIe connections 1186. In some examples, the GPUs 1184 are connected via NVLink and/or NVSwitch SoC and the GPUs 1184 and the PCIe switches 1182 are connected via PCIe interconnects. Although eight GPUs 1184, two CPUs 1180, and two PCIe switches are illustrated, this is not intended to be limiting. Depending on the embodiment, each of the server(s) 1178 may include any number of GPUs 1184, CPUs 1180, and/or PCIe switches. For example, the server(s) 1178 may each include eight, sixteen, thirty-two, and/or more GPUs 1184.

The server(s) 1178 may receive, over the network(s) 1190 and from the vehicles, image data representative of images showing unexpected or changed road conditions, such as recently commenced road-work. The server(s) 1178 may transmit, over the network(s) 1190 and to the vehicles, neural networks 1192, updated neural networks 1192, and/or map information 1194, including information regarding traffic and road conditions. The updates to the map information 1194 may include updates for the HD map 1122, such as information regarding construction sites, potholes, detours, flooding, and/or other obstructions. In some examples, the neural networks 1192, the updated neural networks 1192, and/or the map information 1194 may have resulted from new training and/or experiences represented in data received from any number of vehicles in the environment, and/or based at least in part on training performed at a datacenter (e.g., using the server(s) 1178 and/or other servers).

The server(s) 1178 may be used to train machine learning models (e.g., neural networks) based at least in part on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 1190, and/or the machine learning models may be used by the server(s) 1178 to remotely monitor the vehicles.

In some examples, the server(s) 1178 may receive data from the vehicles and apply the data to up-to-date real-time neural networks for real-time intelligent inferencing. The server(s) 1178 may include deep-learning supercomputers and/or dedicated AI computers powered by GPU(s) 1184, such as a DGX and DGX Station machines developed by NVIDIA. However, in some examples, the server(s) 1178 may include deep learning infrastructure that use only CPU-powered datacenters.

The deep-learning infrastructure of the server(s) 1178 may be capable of fast, real-time inferencing, and may use that capability to evaluate and verify the health of the processors, software, and/or associated hardware in the vehicle 1100. For example, the deep-learning infrastructure may receive periodic updates from the vehicle 1100, such as a sequence of images and/or objects that the vehicle 1100 has located in that sequence of images (e.g., via computer vision and/or other machine learning object classification techniques). The deep-learning infrastructure may run its own neural network to identify the objects and compare them with the objects identified by the vehicle 1100 and, if the results do not match and the infrastructure concludes that the AI in the vehicle 1100 is malfunctioning, the server(s) 1178 may transmit a signal to the vehicle 1100 instructing a fail-safe computer of the vehicle 1100 to assume control, notify the passengers, and complete a safe parking maneuver.

For inferencing, the server(s) 1178 may include the GPU(s) 1184 and one or more programmable inference accelerators (e.g., NVIDIA's TensorRT 3). The combination of GPU-powered servers and inference acceleration may make real-time responsiveness possible. In other examples, such as where performance is less critical, servers powered by CPUs, FPGAs, and other processors may be used for inferencing.

Example Computing Device

FIG. 12 is a block diagram of an example computing device 1200 suitable for use in implementing some embodiments of the present disclosure, such as the object detector 106 and one or more parts of the network 502. Computing device 1200 may include a bus 1202 that directly or indirectly couples the following devices: memory 1204, one or more central processing units (CPUs) 1206, one or more graphics processing units (GPUs) 1208, a communication interface 1210, input/output (I/O) ports 1212, input/output components 1214, a power supply 1216, and one or more presentation components 1218 (e.g., display(s)).

Although the various blocks of FIG. 12 are shown as connected via the bus 1202 with lines, this is not intended to be limiting and is for clarity only. For example, in some embodiments, a presentation component 1218, such as a display device, may be considered an I/O component 1214 (e.g., if the display is a touch screen). As another example, the CPUs 1206 and/or GPUs 1208 may include memory (e.g., the memory 1204 may be representative of a storage device in addition to the memory of the GPUs 1208, the CPUs 1206, and/or other components). In other words, the computing device of FIG. 12 is merely illustrative. Distinction is not made between such categories as "workstation," "server," "laptop," "desktop," "tablet," "client device," "mobile device," "hand-held device," "game console," "electronic control unit (ECU)," "virtual reality system,"

and/or other device or system types, as all are contemplated within the scope of the computing device of FIG. 12.

The bus 1202 may represent one or more busses, such as an address bus, a data bus, a control bus, or a combination thereof. The bus 1202 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 1204 may include any of a variety of computer-readable media. The computer-readable media may be any available media that may be accessed by the computing device 1200. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1204 may store computer-readable instructions (e.g., that represent a program(s) and/or a program element(s), such as an operating system). Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1200. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 1206 may be configured to execute the computer-readable instructions to control one or more components of the computing device 1200 to perform one or more of the methods and/or processes (e.g., processes in FIGS. 2, 5A, and 7-9) described herein. The CPU(s) 1206 may each include one or more cores (e.g., one, two, four, eight, twenty-eight, seventy-two, etc.) that are capable of handling a multitude of software threads simultaneously. The CPU(s) 1206 may include any type of processor, and may include different types of processors depending on the type of computing device 1200 implemented (e.g., processors with fewer cores for mobile devices and processors with more cores for servers). For example, depending on the type of computing device 1200, the processor may be an ARM processor implemented using Reduced Instruction Set Computing (RISC) or an x86 processor implemented using Complex Instruction Set Computing (CISC). The computing device 1200 may include one or more CPUs 1206 in addition to one or more microprocessors or supplementary co-processors, such as math co-processors.

The GPU(s) 1208 may be used by the computing device 1200 to render graphics (e.g., 3D graphics). The GPU(s) 1208 may include hundreds or thousands of cores that are capable of handling hundreds or thousands of software threads simultaneously. The GPU(s) 1208 may generate pixel data for output images in response to rendering commands (e.g., rendering commands from the CPU(s) 1206 received via a host interface). The GPU(s) 1208 may include graphics memory, such as display memory, for storing pixel data. The display memory may be included as part of the memory 1204. The GPU(s) 1208 may include two or more GPUs operating in parallel (e.g., via a link) When combined together, each GPU 1208 may generate pixel data for different portions of an output image or for different output images (e.g., a first GPU for a first image and a second GPU for a second image). Each GPU may include its own memory, or may share memory with other GPUs.

In examples where the computing device 1200 does not include the GPU(s) 1208, the CPU(s) 1206 may be used to render graphics.

The communication interface 1210 may include one or more receivers, transmitters, and/or transceivers that enable the computing device 1200 to communicate with other computing devices via an electronic communication network, included wired and/or wireless communications. The communication interface 1210 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 1212 may enable the computing device 1200 to be logically coupled to other devices including the I/O components 1214, the presentation component(s) 1218, and/or other components, some of which may be built in to (e.g., integrated in) the computing device 1200. Illustrative I/O components 1214 include a microphone, mouse, keyboard, joystick, game pad, game controller, satellite dish, scanner, printer, wireless device, etc. The I/O components 1214 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be include depth cameras, such as stereoscopic camera systems, infrared camera systems, RGB camera systems, touchscreen technology, and combinations of these, for gesture detection and recognition. Additionally, the computing device 1200 may include accelerometers or gyroscopes (e.g., as part of an inertia measurement unit (IMU)) that enable detection of motion. In some examples, the output of the accelerometers or gyroscopes may be used by the computing device 1200 to render immersive augmented reality or virtual reality.

The power supply 1216 may include a hard-wired power supply, a battery power supply, or a combination thereof. The power supply 1216 may provide power to the computing device 1200 to enable the components of the computing device 1200 to operate.

The presentation component(s) 1218 may include a display (e.g., a monitor, a touch screen, a television screen, a heads-up-display (HUD), other display types, or a combination thereof), speakers, and/or other presentation components. The presentation component(s) 1218 may receive data from other components (e.g., the GPU(s) 1208, the CPU(s) 1206, etc.), and output the data (e.g., as an image, video, sound, etc.). In one aspect, the presentation component(s) may display an image (e.g., 525) that delineates a parking space, an entry to a parking space, or any combination thereof.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The invention claimed is:

1. A method comprising:
   applying, to one or more machine learning models (MLMs), sensor data representative of at least one field of view or sensory field of at least one sensor, the at least one field of view or sensory field including at least a portion of a target space;
   receiving, from the one or more MLMs, data indicating likelihoods that one or more points of a multi-dimensional shape correspond to one or more portions of a boundary of the target space representing an entrance to the target space;
   identifying, using the data, one or more locations associated with the one or more points as corresponding to the boundary of the target space; and
   performing one or more planning, control, parking, or navigation operations corresponding to a machine based at least on the one or more locations corresponding to the boundary.

2. The method of claim 1, wherein the data further indicates one or more displacement values to the one or more points, and the identifying of the one or more locations is based at least on the one or more displacement values.

3. The method of claim 1, wherein the one or more points include corner points of the multi-dimensional shape.

4. The method of claim 1, wherein the one or more points include a plurality of points of the multi-dimensional shape, and the method further includes determining, based at least on the likelihoods, that a subset of the plurality of points correspond to the entrance, wherein the identifying of the one or more locations is based at least on the subset of the plurality of points.

5. The method of claim 1, wherein the one or more points include one or more vertices defining the multi-dimensional shape.

6. The method of claim 1, wherein the data further indicates a probability that the multi-dimensional shape corresponds to the target space.

7. The method of claim 1, wherein the multi-dimensional shape comprises a skewed quadrilateral.

8. The method of claim 1, wherein the one or more locations correspond to a bounding shape of the target space.

9. The method of claim 1, wherein the sensor data is obtained using at least one sensor of the machine.

10. The method of claim 1, wherein the one or more planning, control, parking, or navigation operations correspond to the machine traversing the entrance to the target space.

11. A system comprising:
    one or more processors to execute operations comprising:
       applying, to one or more machine learning models (MLMs) trained to predict likelihoods that one or more points of a multi-dimensional shape correspond to one or more portions of a boundary of a target space, the boundary representing an entrance to the target space, sensor data corresponding to at least one field of view or sensory field of at least one sensor, the at least one field of view or sensory field including at least a portion of the target space;
       receiving, from the one or more MLMs, data indicating the one or more points correspond to the one or more portions of the boundary of the target space;
       identifying, using the data, one or more locations associated with the one or more points as corresponding to the boundary of the target space; and
       performing one or more planning, control, parking, or navigation operations corresponding to a machine based at least on the identifying of the one or more locations as corresponding to the boundary.

12. The system of claim 11, wherein the data further indicates one or more displacement values to the one or more points, and the identifying of the one or more locations is based at least on the one or more displacement values.

13. The system of claim 11, wherein the one or more points include corner points of the multi-dimensional shape.

14. The system of claim 11, wherein the one or more points include a plurality of points of the multi-dimensional shape, and the operations further include determining, using the data, that a subset of the plurality of points correspond to the boundary representing the entrance.

15. The system of claim 11, wherein the one or more planning, control, parking, or navigation operations correspond to the machine traversing the entrance to the target space.

16. An autonomous or semi-autonomous machine comprising:
one or more central processing units (CPUs);
one or more graphics processing units (GPUs);
one or more hardware accelerators; and
one or more external sensors having one or more fields of view or one or more sensory fields external to the autonomous or semi-autonomous machine,
wherein the autonomous or semi-autonomous machine is to:
identify one or more portions of a boundary of a target space representing an entrance to the target space in an environment based at least on generating, using one or more machine learning models (MLMs), data indicating one or more points of a shape correspond to one or more portions of the boundary of the target space; and
perform one or more planning, control, parking, or navigation operations based at least on the one or more portions of the boundary being identified.

17. The autonomous or semi-autonomous machine of claim 16, wherein the data further indicates one or more displacement values to the one or more points, and the identifying of the one or more portions of the entrance is based at least on the one or more displacement values.

18. The autonomous or semi-autonomous machine of claim 16, wherein the one or more points include corner points of the shape.

19. The autonomous or semi-autonomous machine of claim 16, wherein the one or more points include a plurality of points of the shape, and the autonomous or semi-autonomous machine is further to determine, based at least on the data, that a subset of the plurality of points correspond to the entrance, wherein the identifying of the one or more portions is based at least on the subset of the plurality of points.

20. The autonomous or semi-autonomous machine of claim 16, wherein the one or more planning, control, parking, or navigation operations correspond to the autonomous or semi-autonomous machine entering the target space.

* * * * *